(12) United States Patent
Chandramouli et al.

(10) Patent No.: US 10,896,178 B2
(45) Date of Patent: Jan. 19, 2021

(54) HIGH PERFORMANCE QUERY PROCESSING AND DATA ANALYTICS

(71) Applicant: Microsoft Technology Licensing, LLC, Redmond, WA (US)

(72) Inventors: Badrish Chandramouli, Redmond, WA (US); Raul Castro Fernandez, Cambridge, MA (US); Abdul H. Quamar, San Jose, CA (US); Ahmed Eldawy, Saint Paul, MN (US); Jonathan D. Goldstein, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 993 days.

(21) Appl. No.: 15/085,468

(22) Filed: Mar. 30, 2016

(65) Prior Publication Data

US 2017/0286485 A1    Oct. 5, 2017

(51) Int. Cl.
*G06F 16/2453*    (2019.01)
*G06F 16/2458*    (2019.01)
*G06F 16/245*     (2019.01)

(52) U.S. Cl.
CPC ...... *G06F 16/24544* (2019.01); *G06F 16/245* (2019.01); *G06F 16/2477* (2019.01); *G06F 16/24549* (2019.01)

(58) Field of Classification Search
CPC .. G06F 17/30433; G06F 21/62; G06F 16/254; G06F 16/34; G06F 21/71; G06F 16/24544

See application file for complete search history.

(56) References Cited

U.S. PATENT DOCUMENTS 6,446,136 B1   9/2002   Pohlmann et al.
7,996,388 B2   8/2011   Jain et al.
(Continued)

FOREIGN PATENT DOCUMENTS

WO    WO2011162628 A2    12/2011

OTHER PUBLICATIONS

Abadi, et al., "The Design of the Borealis Stream Processing Engine", In Proceedings of the Conference on Innovative Data Systems Research, Jan. 4, 2005, 13 pages.
(Continued)

*Primary Examiner* — Mariela Reyes
*Assistant Examiner* — Courtney Harmon
(74) *Attorney, Agent, or Firm* — Schwegman Lundberg & Woessner, P.A.

(57) ABSTRACT

High performance query processing and data analytics can be performed across architecturally diverse scales, such as single core, multi-core and/or multi-nodes. The high performance query processing and data analytics can include a separation of query computation, keying data, and data movement and parallel computation, thereby enhancing the capabilities of the query processing and data analytics, while allowing the specification of complex forms of data parallel computation that may execute across real-time and offline. The decoupling of data movement and parallel computation, as described herein can improve query processing and data analytics speed, can provide for the optimization of searches in a plurality of computing environments, and can provide the ability to search through a larger space of execution plans.

20 Claims, 12 Drawing Sheets

(56) References Cited

U.S. PATENT DOCUMENTS

| | | | |
|---|---|---|---|
| 8,478,743 | B2 | 7/2013 | Chandramouli et al. |
| 8,484,243 | B2 | 7/2013 | Krishnamurthy et al. |
| 8,694,565 | B2 | 4/2014 | Beckman et al. |
| 8,990,416 | B2 | 3/2015 | Shukla et al. |
| 2005/0251680 | A1* | 11/2005 | Brown .............. H04W 12/04 713/171 |
| 2009/0125635 | A1 | 5/2009 | Barga et al. |
| 2009/0171890 | A1 | 7/2009 | Johnson et al. |
| 2010/0088298 | A1 | 4/2010 | Xu |
| 2011/0231389 | A1 | 9/2011 | Surna et al. |
| 2011/0282812 | A1 | 11/2011 | Chandramouli et al. |
| 2012/0166417 | A1 | 6/2012 | Chandramouli et al. |
| 2013/0031567 | A1 | 1/2013 | Nano et al. |
| 2013/0066924 | A1 | 3/2013 | Iyer et al. |
| 2013/0124466 | A1* | 5/2013 | Naidu ................ G06F 16/235 707/610 |
| 2013/0159969 | A1 | 6/2013 | Meijer et al. |
| 2013/0204896 | A1 | 8/2013 | Jimenez Peris et al. |
| 2013/0254771 | A1 | 9/2013 | Musayev et al. |
| 2013/0290249 | A1 | 10/2013 | Merriman et al. |
| 2014/0095447 | A1 | 4/2014 | Deshmukh et al. |
| 2014/0372438 | A1 | 12/2014 | Chandramouli et al. |
| 2015/0169683 | A1 | 6/2015 | Chandramouli et al. |
| 2015/0234895 | A1 | 8/2015 | Erdogan et al. |
| 2016/0004751 | A1 | 1/2016 | Lafuente Alvarez et al. |
| 2016/0055220 | A1* | 2/2016 | Joshi ............... G06F 17/30336 707/722 |
| 2016/0171068 | A1* | 6/2016 | Hardin ............. G06F 11/1415 707/610 |
| 2016/0191509 | A1* | 6/2016 | Bestler ............. G06F 12/1408 713/163 |

OTHER PUBLICATIONS

Akidau, et al, "MillWheel: Fault-Tolerant Stream Processing at Internet Scale", In Proceedings of the VLDB Endowment, vol. 6, Issue 11, Aug. 2013, pp. 1033-1044.

Akidau, et al., "The Dataflow Model: A Practical Approach to Balancing Correctness, Latency, and Cost in Massive-Scale, Unbounded, Out-of-Order Data Processing", In Proceedings of the VLDB Endowment, vol. 8, Issue 12, Aug. 2015, pp. 1792-1803.

Alexandrov, et al., "The Stratosphere Platform for Big Data Analytics", In International Journal on Very Large Data Bases, vol. 23, Issue 6, Dec. 2014, pp. 939-964.

Ali, et al., "Spatio-Temporal Stream Processing in Microsoft StreamInsight", In Proceedings of IEEE Data Engineering Bulletin, vol. 33, No. 2, Jun. 2010, pp. 1-6.

"Apache Hadoop NextGen MapReduce (YARN)", Retrieved on: Jan. 12, 2016 Available at: http://hadoop.apache.org/docs/current/hadoop-yarn/hadoop-yarn-site/YARN.html, 2 pages.

"Apache Storm", Retrieved on: Jan. 12, 2016; Available at: http://storm.apache.org/, 4 pages.

Armbrust, Michael Paul, "Scale-Independent Relational Query Processing", In Technical Report No. UCB/EECS-2013-165, Oct. 4, 2013, 144 pages.

Armbrust, et al., "Spark SQL: Relational Data Processing in Spark", in Proceedings of the ACM SIGMOD International Conference on Management of Data, May 31, 2015, pp. 1383-1394.

Babcock, et al., "Models and Issues in Data Stream Systems", In Proceedings of the twenty-first ACM SIGMOD-SIGACT-SIGART symposium on Principles of database systems, Jun. 3, 2002, pp. 1-16.

Badrish, et al., "Scalable Progressive Analytics on Big Data in the Cloud" In Proceedings of the VLDB Endowment, vol. 6, No. 14, Aug. 26, 2013, 12 pages.

Barga, et al., "Consistent Streaming through Time: A Vision for Event Stream Processing", In Proceedings of 3rd Biennial Conference on Innovative Data Systems Research, Jan. 7, 2007, 12 pages.

Barnett, et al.,"Stat!—An Interactive Analytics Environment for Big Data" In Proceedings of the ACM SIGMOD International Conference on Management of Data, Jun. 22, 2013, 4 pages.

Barnett, et al., "Stat! An Interactive Analytics Environment for Big Data", In Proceedings of ACM SIGMOD International Conference on Management of Data, Jun. 22, 2013, pp. 1013-1016.

"BigQuery", Retrieved on: Jan. 12, 2016; Available at: https://cloud.google.com/bigquery/, 4 pages.

Chambers, et al., "FlumeJava: Easy, Efficient Data-Parallel Pipelines", In Proceedings of the 31st ACM SIGPLAN Conference on Programming Language Design and Implementation, Jun. 5, 2010, pp. 363-375.

Chandramouli, et al., "Scalable Progressive Analytics on Big Data in the Cloud", In Proceedings of International Conference on Very Large Data Bases, vol. 6, Issue 14, Aug. 26, 2013, pp. 1726-1737.

Chandramouli, et al., "Temporal Analytics on Big Data for Web Advertising", In Proceedings of the IEEE 28th International Conference on Data Engineering, Apr. 2012, 13 pages.

Chandramouli, et al., "The Trill Incremental Analytics Engine", In Microsoft Research Technical Report MSR-TR-2014-54, Apr. 2014, 14 pages.

Chandramouli, et al., "Trill: A High-Performance Incremental Query Processor for Diverse Analytics", In Proceedings of the VLDB Endowment, vol. 8, Issue 4, Dec. 2014, pp. 401-412.

"Column Store Features", Published on: May 9, 2011, Available at: http://www.monetdb.org/Home/Features.

Dean, et al., "MapReduce: Simplified Data Processing on Large Clusters", In Journal of Communications of the ACM Magazine, vol. 51, Issue 1, Jan. 2008, pp. 107-113.

"Expression Trees (C# and Visual Basic)", Retrieved on: Jan. 12, 2016 Available at: https://msdn.microsoft.com/en-us/library/bb397951.aspx, 4 pages.

Fernandez, et al., "Integrating Scale Out and Fault Tolerance in Stream Processing using Operator State Management", in Proceedings of ACM SIGMOD International Conference on Management of Data, Jun. 22, 2013, pp. 725-736.

"GitHub Archive", Retrieved on: Jan. 12, 2016; Available at: https://www.githubarchive.org/, 3 pages.

Grover, et al., "SQL-like Big Data Environments: Case Study in Clinical Trial Analytics", In Proceedings of IEEE International Congress on Big Data, Oct. 29, 2015, pp. 2680-2689.

Gulisano, et al., "StreamCloud: A Large Scale Data Streaming System" In Proceedings of International Conference on Distributed Computing System, Jun. 21, 2010, 12 pages.

Gupta, et al., "Amazon Redshift and the Case for Simpler Data Warehouses", In Proceedings of ACM SIGMOD International Conference on Management of Data, May 31, 2015, pp. 1917-1923.

Hilley, et al., "Persistent Temporal Streams" In Proceedings of the 10th ACM/IFIP/USENIX International Conference on Middleware, Nov. 30, 2009, 20 pages.

Hugg, John, "Lambda Complexity: Why Fast Data Needs New Thinking", Published on: Mar. 17, 2015 Available at: https://voltdb.com/blog/lambda-complexity-why-fast-data-needs-new-thinking, 14 pages.

"In-Stream Big Data Processing", Published on: Aug. 20, 2013, Available at: http://highlyscalable.wordpress.com/2013/08/20/in-stream-big-data-processing/#comments, 23 pages.

Isard, et al., "Dryad: Distributed Data-Parallel Programs from Sequential Building Blocks", In Proceedings of 2nd ACM SIGOPS/EuroSys European Conference on Computer Systems, Mar. 21, 2007, pp. 59-72.

Jensen, et al., "Temporal Data Management", In Journal of IEEE Transactions on Knowledge and Data Engineering, vol. 11, Issue 1, Jan. 1999, pp. 36-44.

Kornacker, et al., "Impala: A Modern, Open-Source SQL Engine for Hadoop", In Proceedings of 7th Biennial Conference on Innovative Data Systems Research, Jan. 4, 2015, 10 pages.

Leetaru, Kalev H., "World's Largest Event Dataset Now Publicly Available in BigQuery", Published on: May 29, 2014, Available at: http://googlecloudplatform.blogspot.in/2014/05/worlds-largest-event-dataset-now-publicly-available-in-google-bigquery.html; 5 pages.

Li, et al., "No Pane, No Gain: Efficient Evaluation of Sliding-Window Aggregates over Data Streams", In Journal of ACM SIGMOD Record, vol. 34, Issue 1, Mar. 2005, pp. 39-44.

(56) References Cited

OTHER PUBLICATIONS

Liarou, et al., "A Column-Oriented Data Stream Engine", Retrieved on: Oct. 17, 2013, Available at:http://citeseerx.ist.psu.edu/viewdoc/downloaddoi=10.1.1.108.9843& rep=rep1&type=pdf, 9 pages.
"LINQ (Language-Integrated Query)", Retrieved on: Jan. 12, 2016 Available at: https://msdn.microsoft.com/en-us/library/bb397926.aspx, 2 pages.
Marz, Nathan, "How to beat the CAP Theorem", Published on: Oct. 13, 2011 Available at: http://nathanmarz.com/blog/how-to-beat-the-cap-theorem.html, 10 pages.
"Microsoft Azure", Retrieved on: Jan. 12, 2016; Available at: https://azure.microsoft.com/en-us/, 7 Pages.
Murray, et al., "Naiad: A Timely Dataflow System", In Proceedings of the Twenty-Fourth ACM Symposium on Operating Systems Principles, Nov. 3, 2013, pp. 439-455.
Office action for U.S. Appl. No. 14/109,643, dated Dec. 31, 2015, Chandramouli et al., "Analytical Data Processing Engine", 15 pages.
Office action for U.S. Appl. No. 14/109,643, dated Aug. 13, 2015, Chandramouli et al., "Analytical Data Processing Engine ", 11 pages.
Okcan, et al., "Processing Theta-Joins using MapReduce", In Proceedings of the ACM SIGMOD International Conference on Management of data, Jun. 12, 2011, pp. 949-960.
Pavlo, et al., "A comparison of approaches to large-scale data analysis", In Proceedings of the ACM SIGMOD International Conference on Management of data, Jun. 29, 2009, pp. 165-178.
Stonebraker, et al., "C-store: A Column-oriented DBMS", In Proceedings of the 31st international conference on Very large data bases, Aug. 30, 2005, pp. 553-564.
Thusoo, et al., "Hive—A Warehousing Solution Over a Map-Reduce Framework", In Proceedings of the VLDB Endowment, vol. 2, Issue 2, Aug. 24, 2009, pp. 1626-1629.
Tucker, et al., "Exploiting Punctuation Semantics in Continuous Data Streams", In IEEE Transactions on Knowledge and Data Engineering, vol. 15, Issue 3, May 2003, 14 pages.
Weimer, et al., "REEF: Retainable Evaluator Execution Framework", In Proceedings of the ACM SIGMOD International Conference on Management of Data, May 27, 2015, pp. 1343-1355.
Xin, et al., "Shark: SQL and Rich Analytics at Scale", In Proceedings of the ACM SIGMOD International Conference on Management of Data, Jun. 22, 2013, pp. 13-24.
Yu, et al., "DryadLINQ: a System for General-Purpose Distributed Data-Parallel Computing using a High-Level Language", In Proceedings of the 8th USENIX conference on Operating systems design and implementation, Dec. 8, 2008, pp. 1-12.
Zaharia, et al., "Discretized Streams: An Effcient and Fault-Tolerant Model for Stream Processing on Large Cluster" In Proceedings of the 4th USENIX conference on Hot Topics in Cloud Computing, Jun. 12, 2012, 6 pages.
Zaharia, et al., "Resilient Distributed Datasets: A Fault-Tolerant Abstraction for In-Memory Cluster Computing", In Proceedings of the 9th USENIX conference on Networked Systems Design and Implementation, Apr. 25, 2012, 14 pages.
Zhang, et al., "Lightweight Distributed Execution Engine for Large-Scale Spatial Join Query Processing", In Proceedings of IEEE International Congress on Big Data, Jun. 27, 2015, 8 pages.
Chandramouli, et al., "Trill: A High-Performance Incremental Query Processor for Diverse Analytics", Retrieved from: <<http://badrish.net/papers/trill-vldb2015-slides.pdf>>, Sep. 30, 2015, 15 Pages.
"International Search Report and Written Opinion Issued in PCT Application No. PCT/US2017/024216", dated Jun. 30, 2017, 15 pages.
Office action for U.S. Appl. No. 14/109,643, dated Aug. 18, 2016, Chandramouli et al., "Analytical Data Processing Engine", 21 pages.
Office action for U.S. Appl. No. 14/109,643, dated Dec. 22, 2016, Chandramouli et al., "Analytical Data Processing Engine", 27 pages.

Ali, et al., "The Extensibility Framework in Microsoft StreamInsight", In Proceedings of the IEEE 27th International Conference on Data Engineering, Apr. 11, 2011, 12 pages.
Anicic, et al., "EP-SPARQL: A Unified Language for Event Processing and Stream Reasoning", In Proceedings of the 20th international conference on World wide web, Mar. 28, 2011, pp. 635-644.
Arasu, et al., "Stream: The Stanford Data Stream Management System", In Technical Report, Mar. 2004, pp. 1-21.
Barga, et al., "Consistent streaming through time: A Vision for Event Stream Processing", In Proceedings of 3rd Biennial Conference on Innovative Data Systems Research, Jan. 7, 2007, pp. 363-374.
Boncz, et al., "MonetDB/XQuery: A Fast XQuery Processor Powered by a Relational Engine", In Proceedings of the 2006 ACM SIGMOD international conference on Management of data, Jun. 27, 2006, pp. 479-490.
Bonnet, et al., "Towards Sensor Database Systems", In Proceedings of the Second International Conference on Mobile Data Management, Jan. 8, 2001, 12 pages.
Brown, Paul G., "Overview of sciDB: Large scale array storage, processing and analysis", In Proceedings of ACM SIGMOD International Conference on Management of data, Jun. 6, 2010, pp. 963-968.
Chandrasekaran, et al., "TelegraphCQ: continuous dataflow processing", In Proceedings of the ACM SIGMOD international conference on Management of data, Jun. 9, 2003, pp. 668.
Chong, et al., "Sensor Networks: Evolution, Opportunities, and Challenges", In Proceedings of the IEEE, vol. 91, Issue 8, Aug. 2003, pp. 1247-1256.
Cranor, et al., "Gigascope: A Stream Database for Network applications", In Proceedings of the ACM SIGMOD international conference on Management of data, Jun. 9, 2003, pp. 647-651.
"Expression Trees", Retrieved on: Apr. 5, 2016 Available at: https://msdn.microsoft.com/en-us/enus/library/bb397951.aspx, 4 pgs.
Gedik, et al., "SPADE: The System S Declarative Stream Processing Engine", In Proceedings of the ACM SIGMOD international conference on Management of data, Jun. 9, 2008, pp. 1123-1134.
Girod, et al., "The Case for a Signal-Oriented Data Stream Management System", In Proceedings of 3rd Biennial Conference on Innovative Data Systems Research, Jan. 7, 2007, 10 pages.
Girod, et al., "XStream: A Signal-oriented Data Stream Management System", In Proceedings of IEEE 24th International Conference on Data Engineering, Apr. 7, 2008, pp. 1180-1189.
Hammad, et al., "Nile: A Query Processing Engine for Data Streams", In Proceedings of 20th International Conference on Data Engineering, Mar. 30, 2004, 1 page.
Jensen, et al., "Temporal specialization", In Proceedings of the Eighth International Conference on Data Engineering, Feb. 3, 1992, pp. 594-603.
Katsis, et al., "Combining Databases and Signal Processing in Plato", In Proceedings of Seventh Biennial Conference on Innovative Data Systems Research, Jan. 4, 2015, 9 pages.
"LabVIEW System Design Software", Retrieved on: Apr. 5, 2016 Available at: http://www.ni.com.labview, 3 pgs.
Lander, et al., "Appion: an integrated, database-driven pipeline to facilitate EM image processing", In Journal of structural biology vol. 166, No. 1, Apr. 2009, pp. 1-16.
Madden, et al., "TinyDB: An Acquisitional Query Processing System for Sensor Networks", In Journal of ACM Transactions on Database Systems, vol. 30, Issue 1, Mar. 2005, pp. 1-47.
Maier, et al., "Semantics of data streams and operators", In Proceedings of the 10th international conference on Database Theory, Jan. 5, 2005, pp. 37-52.
Office action for U.S. Appl. No. 14/109,643, dated Apr. 29, 2016, Chandramouli et al., "Analytical Data Processing Engine", 18 pages.
"Process streaming signals and large data with System objects", Retrieved on: Mar. 29, 2016 Available at: http://in.mathworks.com/discovery/stream-processing.html?requestedDomain=www.mathworks.com, 4 pgs.
"Run R programs within SciDB queries", Retrieved on: Apr. 5, 2016 Available at: https://github.com/Paradigm4/r_exec, 2 pgs.

(56) References Cited

OTHER PUBLICATIONS

"Signal Processing Toolbox", Retrieved on: Apr. 5, 2016 Available at: http://www.mathworks.com/products/signal, 2 pgs.
Smith, Steven W., "The Scientist & Engineer's Guide to Digital Signal Processing", Chapter 4, In Publication of California Technical Publishing, Apr. 5, 2016, 20 pgs.
"SQL Server R Services", Retrieved on: Apr. 5, 2016 Available at: https://msdn.microsoft.com/en-us/enus/library/mt604845.aspx, 2 pgs.
Stonebraker, et al., "Requirements for Science Data Bases and SciDB", In Proceedings of Fourth Biennial Conference on Innovative Data Systems Research, Jan. 4, 2009, 9 pages.
"StreamBase", Retrieved on: Apr. 5, 2016 Available at: http://www.streamlbase.com/, 2 pgs.
Sullivan, et al., "Tribeca: A System for Managing Large Databases of Network Traffic", In Proceedings of the USENIX Annual Technical Conference, Jun. 1998, 13 pages.
"Unified Query for Big Data Management Systems", In Oracle White Paper, Mar. 2016, 11 pages.
Zhou, et al., "Unifying the Processing of XML Streams and Relational Data Streams", In Proceedings of the 22nd International Conference on Data Engineering, Apr. 3, 2006, pp. 1-12.

\* cited by examiner

```
                              ┌─ 900
```

- Access a First Dataset
  902
- Apply a First Query Operation to the First Dataset
  904
- Assign a Data Identifer to Individual Shards
  906
- Redistribute Data
  908
- Perform a Calculation on the Third Dataset
  910
- Output a Result of the Calculation for Presentation on a Display
  912

FIG. 9

HIGH PERFORMANCE QUERY PROCESSING AND DATA ANALYTICS

BACKGROUND

Query processing and data analytics platforms may analyze large amounts of data in order to derive insights from the data. In some cases, efficient analysis of such large amounts of data may be difficult to perform in a cost-effective manner. Further, one set of technologies may be employed in the context data stored on a single core, while another set of technologies may be employed in the context of data stored across multiple nodes. Additionally, still different technologies may be employed in the context of online data analytics and offline temporal-relational data. However, to achieve an analysis across different architectures of both online and offline data, multiple technologies would have to be used. Analyzing data across multiple technologies can be computationally expensive, inefficient, and time consuming.

SUMMARY

This disclosure describes systems, methods, and computer-readable media for providing high performance query processing of real-time and offline temporal-relational data. The high performance query processing and data analytics described herein can be performed across architecturally diverse scales, such as single core, multi-core and/or multi-nodes. The high performance query processing and data analytics can include a separation of data movement and parallel computation, thereby enhancing the capabilities of the query processing and data analytics. The decoupling of data movement and parallel computation, as described herein can improve query processing and data analytics speed, can provide for the optimization of searches in a plurality of computing environments, and can provide the ability to search through a larger space of execution plans (e.g., manual search, automated search, such as with a query optimizer, etc.). For example, query processing and data analytics performed in a multi-core setting, such as with a plurality of non-uniform memory access enabled computing devices, can include data partitions by redistribution prior to performing calculations, in order to speed up processing. For another example, instead of redistributing raw data between cores in a multi-core setting, the query processing and data analytics system can first re-key and perform a computation on the data, and then redistribute organized data between cores. For yet another example, the query processing and data analytics system can send data to specific locations (e.g., in cores and/or machines) to enable the execution of complex massively parallel computations.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 9 is a flow diagram that illustrates an example process flow of a query processing and data analytics platform.

DETAILED DESCRIPTION

Overview

Figure 1:
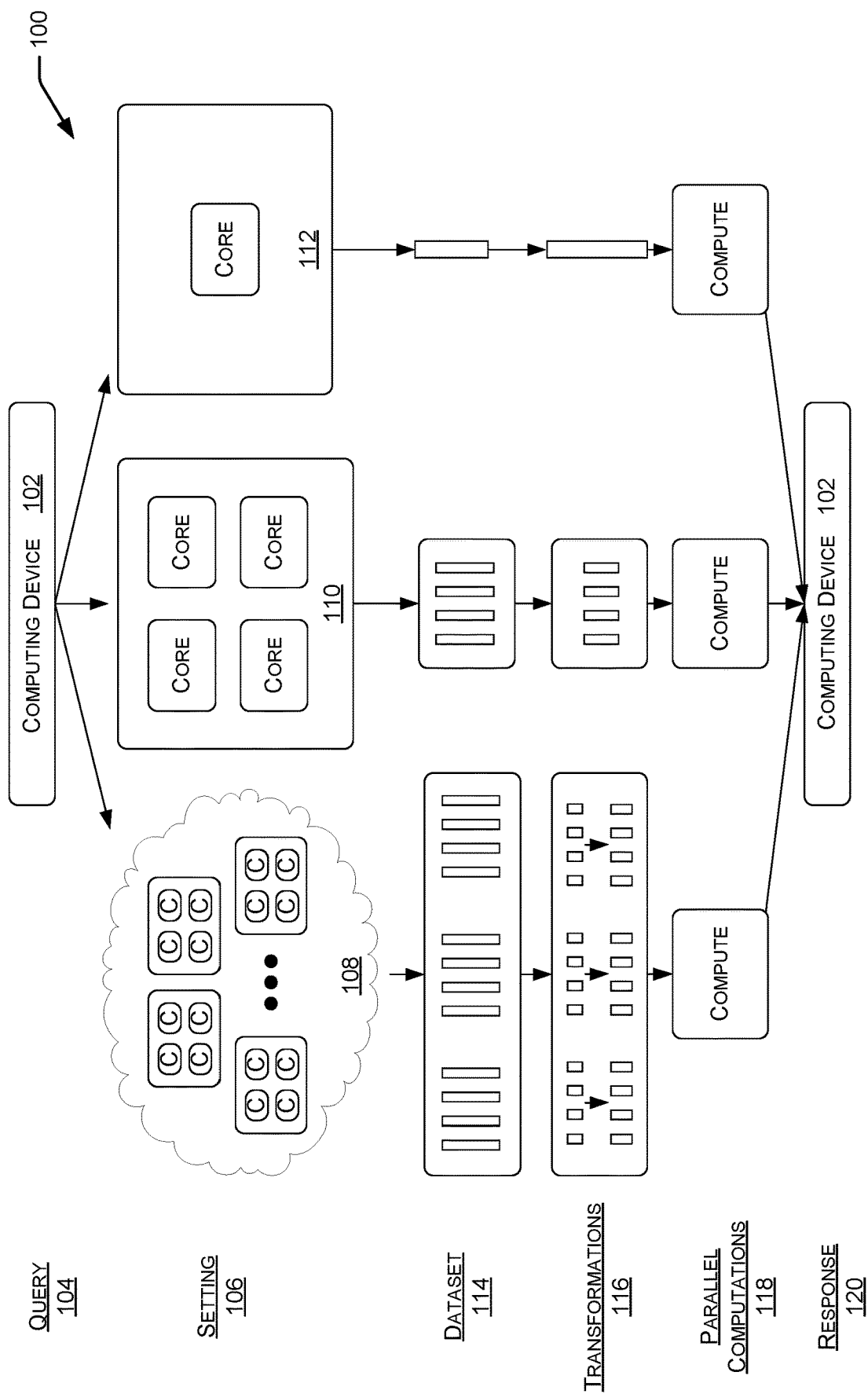
FIG. 1 illustrates an example environment for query processing and data analytics.

The technologies described herein provide techniques and constructs to query processing and data analytics across architecturally diverse scales (e.g., single-core, multi-core, multi-node, etc.). In some configurations, a computing device can receive a query. The query can represent a desired result from an analysis of data. In some examples, the query can include a query plan indicating how the query is to be executed, for example, to target a specific execution plan for a particular situation (e.g., size of datasets, number of datasets, bandwidth between cores of a machine, bandwidth between machines, bandwidth between nodes of a distributed service provider, etc.). In such examples, based on the query plan, the computing device can determine a setting to which the query can be applied. The setting can be a single node on a single machine, or it can be multiple nodes across multiple machines, such as in a Cloud-based architecture. The setting can also include real-time data and/or offline temporal-relational data. In some configurations, the setting can be determined based a user input via a user interface. By receiving a setting input, the query processing and data analytics system can be applied across architecturally diverse scales, thereby increasing the application and/or the efficiency of the system.

In various configurations, one or more datasets can be identified in the setting. The datasets in the setting can be located on the same or different machines. In some examples, a single dataset can be located on (e.g., sharded across) two or more machines. Each dataset can comprise one or more shards of data in a sequence of time-stamped data items. A time-stamp on a data item can be a time in which the data item is saved to a dataset and/or a time in which an event, such as a mouse click, occurred. In some configurations, the one or more shards can include overlapping portions of the dataset. The one or more shards of data can each be associated with a tuple (e.g., a payload). Additionally, in some configurations, the tuples can each be associated with a key. The key may be a data identifier, such as an indication of the payload and/or a description of contents of a particular shard. In such configurations, the shards of the dataset may be unconstrained by (e.g., determined irrespective of) the keys. By not constraining the shards of data, the query processing and data analytics system can access and/or create datasets based upon respective time-stamps of data, thereby increasing efficiency of data analytics over a particular time period.

In some configurations, based on the query input, the computing device can cause one or more transformations to occur on the identified datasets. In various configurations, the transformations can include applying query operations (e.g., single input, multiple input), data movement (e.g., create new datasets, broadcast join between datasets, multicast joins, re-shard, etc.), key-based transformations (e.g., re-key, redistribute), and the like. In such configurations, the one or more transformations can occur on each dataset as a separate function. By separating the keying, data movement and query logic, the computing device can build complex distributed physical plans in an integrated manner by performing transformations and actions on data in a situationally dependent manner. The distributed physical plans can be executed efficiently at different scales, and can also be reused for future query operations. For example, in a multi-core setting with a large number of groups, re-distributing raw data (e.g., data movement) may be computationally expensive. As such, the query processing and data analytics system can allow a re-key of data, to organize payloads of the shards of data, and then a first calculation on the re-keyed data. Based on the first calculation, the shards of data can be re-distributed among the datasets, and a second computation can take place. Thus, the delay of the re-distribution can dramatically reduce the amount of network traffic, as the first calculation can decrease the amount of data to be re-distributed. By separating incremental query logic specification, a small but rich set of data movement operations, and keying, one can build complex distributed physical plans in a HLL that target different scales, including physical plans of modern scan-based columnar databases, continuous queries (e.g., hybrid symmetric hash and broadcast joins), and distributed settings (e.g., selective data replication for multi-way or theta joins and matrix operations). Critically, the physical plans are transferable by construction, between real-time and offline deployments.

In various configurations, the transformations to the identified datasets can result in the creation of new datasets. The query input can be applied to the new datasets, and the computing device can provide a response to the query. In some configurations, the new datasets can be cached to memory for lookup and reuse in a similar query scenario. By saving the datasets (e.g., in main memory and/or external storage), the query processing and data analytics system can save computation time in future queries, thereby increasing the overall efficiency of the system.

Illustrative Environment

The environment described below constitutes but one example and is not intended to limit the claims to any one particular operating environment. Other environments can be used without departing from the spirit and scope of the claimed subject matter.

FIG. 1 shows an example environment 100 for a query processing and data analytics platform. In some examples, the query processing and data analytics platform can include a computing device 102. Example components of the computing device 102 are discussed in further detail with regard to FIG. 10. The computing device 102 can be configured to communicate with one or more other devices via one or more networks.

For example, the one or more networks can include public networks such as the Internet, private networks such as an institutional and/or personal intranet, or some combination of private and public networks. Networks can also include any type of wired and/or wireless network, including but not limited to local area networks (LANs), wide area networks (WANs), personal area networks (PANs), body area networks (BANs), near field communication (NFC), satellite networks, cable networks, Wi-Fi networks, WiMax networks, mobile communications networks (e.g., 3G, 4G, and so forth) or any combination thereof. The one or more networks can utilize communications protocols, including packet-based and/or datagram-based protocols such as internet protocol (IP), hypertext transfer protocol (HTTP), hypertext transfer protocol secure (HTTPS), transmission control protocol (TCP), user datagram protocol (UDP), or other types of protocols.

In various examples, the computing device 102 can belong to a variety of categories or classes of devices such as traditional server devices, desktop computer devices, mobile devices, special purpose devices, and/or embedded devices. Thus, the computing device 102 can include a diverse variety of device types and are not limited to a particular type of device. The computing device 102 can represent, but is not limited to, a desktop computer, a server computer or a blade server such as a web-server, a non-uniform memory access (NUMA) enabled computer, or other computation engine or network-attached storage unit, a personal computer, a mobile computer, a laptop computer, a tablet computer, a telecommunication device, a terminal, a game console, a work station, integrated components for inclusion in a computing device, or any other sort of computing device.

The computing device 102 can receive, at 104, a query for processing. In some examples, the query received at 104 can include a single input query. In other examples, the query received at 104 can include a multiple input query. In some examples, the computing device 102 can receive and process query logic specification. The query logic specification can include a setting 106 to which the query will be applied. The setting 106 can include a multi-node 108, multi-core 110 or a single-core 112 setting. In various examples, the setting 106 can identify one or more other devices involved in the query processing and data analytics platform (e.g., one or more other devices storing datasets involved in query processing and data analytics).

The one or more other devices associated with the multi-node 108 setting can be part of a distributed service platform (e.g., the Cloud). The one or more other devices associated with the multi-core 110 can be substantially similar to the computing device 102. The one or more devices can be configured to communicate with the computing device 102. The one or more other devices can belong to a variety of categories or classes of devices such as traditional consumer devices, desktop computer devices, mobile devices, special purpose devices, and/or embedded devices.

As illustrated above, the setting 106 can include a diverse architecture for data analytics, including operations on a single core, across multiple cores, and/or across multiple nodes in a Cloud-based architecture. Based at least in part on the setting, one or more datasets 114 can be identified across the one or more devices. The one or more datasets 114 can represent a set of shards of data in a time-based sequence. Each of the shards of data can be associated with a payload (e.g., a tuple, a topic). In some examples, each of the shards of data can be associated with a key. In such examples, the key associated with the shard of data may not comprise a constraint on the shard. In various examples, the one or more datasets 114 can be identified based on a payload of one or more shards of data in the dataset 114

At 116, the computing device 102 can cause transformations to be conducted on the datasets 114. In various examples, the computing device 102 can cause the transformations to be conducted based at least in part on input via a user interface. In such examples, each of the transformations is executed separately and independently of other transformations. In some examples, each of the transformations can generate a new dataset 114.

The transformations can include query operations (e.g., applying an unmodified query over each shard), re-shard operations (e.g., round-robin movement of shard contents to achieve equal shard sizes), broadcast operations (e.g., duplicate shard content across all of the shards), re-key operations (e.g., change the key associated with each row in each shard), re-distribute operations (e.g., data movement across shards in a same machine so that same key resides in each shard, data movement across shards in different machines so that same key resides in each shard), and re-naming operations (e.g., construct new payload on each shard). Additionally, transformations can include multicast operations. Multicast is a powerful data movement operation that sends each tuple in each input shard to zero or more result shards, based on a user-provided lambda expression over the payload. Using Multicast, one can selectively replicate tuples to result shards to implement theta-joins, parallel multi-way joins, and matrix operations, spatio-temporal computations, etc. In various examples, the transformations may include one or more of each of the above listed operations. In some examples, the transformations may include one or more of a sub-set of the above listed operations. For example, the transformations can include a query operation, a re-key operation and a re-distribute operation. For another example, the transformations can include a query operation, a broadcast operation, a re-key operation and a re-distribute operation.

Based at least in part on the results from the transformation, parallel computations 118 may be computed to determine a response to the query input. For example, a query input may comprise a multi-core request for a number of people who have accessed a particular website within the past 24 hours. The parallel computations 118 can receive the results from the transformations 116 and determine the number of people who have accessed the particular web site.

At 120, the response can be presented on a display of the computing device 102. Additionally, the computing device 102 can cause one or more actions to be conducted on the transformation results. The one or more actions can be used to materialize query results, such as materializing the transformation results into a main memory (e.g., store computation to a potentially distributed in-memory dataset), to a specified path (e.g., store the results in a persistent data store), to an input/output stream (e.g., take an array of I/O streams as parameter and output each shard in an efficient binary format to the corresponding I/O-stream in the array), and/or to accept specific instructions to operate directly on the results.

Figure 2:
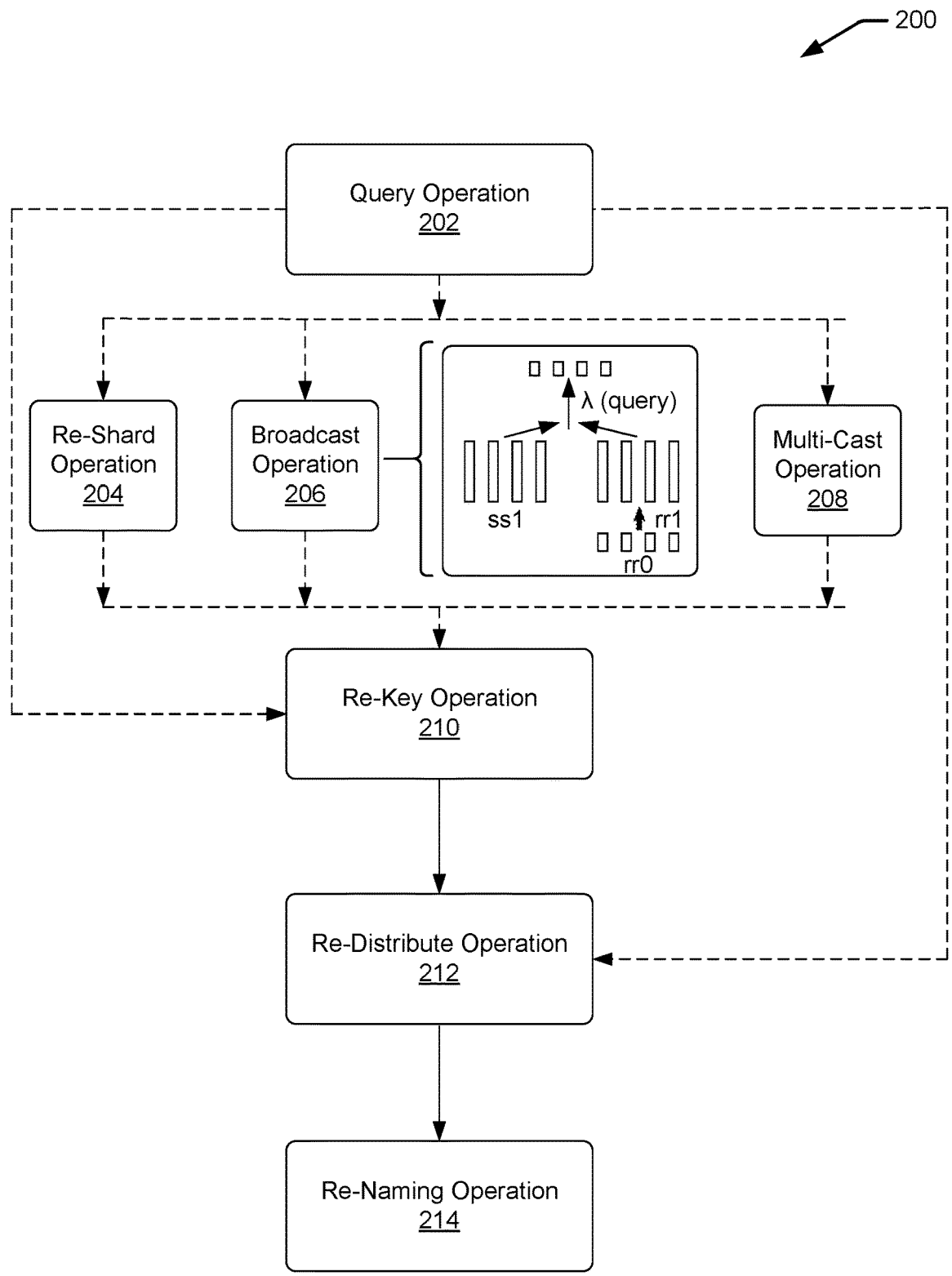
FIG. 2 is a block diagram that illustrates example transformations of datasets corresponding to transformations described in FIG. 1.

FIG. 2 is a block diagram 200 that illustrates transformations to datasets, corresponding to the transformations described in FIG. 1. In various examples, a computing device, such as computing device 102, can receive one or more query inputs. In some examples, the one or more query inputs can be input into and processed by a distributed programming abstraction and framework. Based on the one or more query inputs, the distributed programming abstraction and framework of the computing device can cause one or more query operations 202 to execute across identified datasets. The identified datasets can be located on the computing device and/or across multiple computing devices.

In various examples, the query operation 202 can be executed over single query input. In such examples, the query operation 202 can include an expression (e.g., a lambda expression) that represents an unmodified query to be executed independently on every shard of data in the identified datasets. Query operations 202 may result in shards of a different payload type. For example, a first query operation 202 may include an instruction to select a 20% sample of users based on a "UserID." In such an example, the first query operation 202 may be expressed as follows:

$$\text{var } ss1 = ss0 \cdot \text{Query}(q => q \cdot \text{Where}(e => e \cdot \text{UserId } \% \ 100 < 20)), \quad (1)$$

where ss1 represents a new dataset generated after a query operation is applied to a dataset ss0, e represents the initial number of users, and q represents an unmodified query input.

In various examples, the query operation 202 can be executed over multiple query inputs. In such examples, the query operation 202 can include a two-input expression that operates as a parameter representing an unmodified two-input query (e.g., a join) to be executed over pairs of shards from two input datasets comprising an equivalent number of shards. The query operation 202 can subsequently join the pairs of shards and produce a single sharded dataset as an output. For example, the query operation 202 can include a two-input query comprising a query regarding how often advertisement data, available on a first dataset, is accessed per user, data stored on a second dataset. In such an example, two datasets can be joined together to execute further operations on a combined dataset to determine the query of how often the advertisement data is accessed per user, such as by:

$$ss0 \cdot \text{Query}(ss1, (\text{input } 1, \text{input } 2) => \ldots), \quad (2)$$

where ss1 represents a new dataset generated after input 1, input 2, etc. shards of data are joined to dataset ss0.

In some examples, the query operation 202 can include multiple different query operations executed throughout the transformation process. For example, a first query operation may establish a sample of users, such as illustrated in expression (1). A second query operation may include a count, such as to perform a calculation to determine a desired response.

In various examples, a re-shard operation 204, a broadcast operation 206, and/or a multi-cast operation 208 can be executed on identified datasets. In such examples, the operations can create new datasets with shard contents organized and/or duplicated in a particular way. The re-shard operation 204 can include a round-robin distribution shard contents across a set of result shards. As such, the re-shard operation 204 can be used to spread data evenly across all shards of a dataset to achieve equal shard sizes.

The broadcast operation 206, on the other hand, duplicates the content of each shard across all shards of a dataset. The broadcast operation 206 may be used to transmit the data in a reference dataset across all shards of a dataset in order to compute a particular value, such as advertisement-specific information referenced per user, where a reference dataset may include the advertisement data. As an illustrative example, the broadcast operation 206 can join reference dataset rr0 to a dataset ss1 by the following:

$$\text{var } rr1 = rr0 \cdot \text{Broadcast}(\ ); \tag{3}$$

$$\text{var } ss2 = ss1 \cdot \text{Query}(rr1, (\text{left,right}) => \text{left} \cdot \text{Join}(\text{right},\\ e => e \cdot \text{AdId}, \dots )) \tag{4}$$

The resulting dataset, ss2, includes the data of both ss1 and rr1, where rr1 represents the broadcast of reference dataset rr0. In other words, the resulting dataset, ss2, includes user actions with respect to advertisements and advertisement data by joining the broadcasted reference dataset to an input dataset ss1. The resulting dataset can then be used to compute advertisement-specific information referenced per user.

The multi-cast operation 208 can distribute data to one or more specified shards in a dataset. In various examples, the distributed data can be associated with specific tuples (e.g., payloads, topics, etc.). In some examples, the distributed data can be selected for distribution across specific shards of data based at least in part on the query input.

A re-key operation 210 can be performed on one or more identified and/or resulting datasets. In some examples, the re-key operation 210 can be performed on a resulting dataset from the re-shard operation 204, a broadcast operation 206 or a multi-cast operation. In some examples, the re-key operation 210 can be performed on a dataset resulting from one or more query operations 202.

The re-key operation 210 modifies each tuple (e.g., payload, topic) in the datasets to have a different key. The re-key operation 210 operates independently per shard, thus involving a per-key hash pre-computation. The per-key hash pre-computation can be inexpensive and relatively efficient, thus making the re-key operation 210 an efficient operation. As an illustrative example, a re-key operation 210 can be expressed as follows:

$$\text{var } ss3 = ss2 \cdot \text{ReKey}(e => e \cdot \text{AdId}), \tag{5}$$

where ss3 represents a new dataset generated after a re-key operation is applied to a dataset ss2, e represents the initial dataset, and e·AdId represents the desired result of re-keying the initial dataset based on AdId.

Responsive to the re-key operation 210, the computing device can transform the datasets through a re-distribute operation 212 (e.g., data movement operation). The re-distribute operation 212 can reorganize data across shards, and can output a dataset with the same key and payload time as its input. The reorganization of data across shards can be a redistribution of data across shards so that all rows with the same key reside in the same shard. The re-distribute operation 212 can use hash partitioning based on materialized hash values to reorganize the data. In various examples, the re-distribute operation 212 can be a global reorganization across machines. In some examples, the re-distribute operation 212 can be a local reorganization within a machine, such as across cores of a machine.

In various examples, the re-distribute operation 212 can build on the re-key operation 210. For example, responsive to the re-key operation 210 of expression (5), the re-distribute operation 212 can reorganize data based upon the AdId. The re-distribute operation 212 can be expressed as follows:

$$\text{var } ss4 = ss3 \cdot \text{ReDistribute}(\ ), \tag{6}$$

where ss4 represents a new dataset generated after a re-distribute operation is applied to a dataset ss3.

In some examples, the re-distribute operation 212 can be followed by a query operation 202, based at least in part on the query input. For example, after the redistribute operation 212 of expression (6), the computing device can execute a query operation 202 to calculate a per-AdId count. The query operation 202 to calculate the per-AdId count can be expressed as follows:

$$\text{var } ss5 = ss4 \cdot \text{Query}(q => q \cdot \text{Count}(\ )), \tag{7}$$

where ss5 represents a new dataset generated after a query operation of a count is applied to a dataset ss4, q represents an input, and q·Count represents the count operation applied to the input.

In some examples, the query operation 202 and re-distribute operation 212 can be combined in a local-global aggregation. The local-global aggregation can be expressed as follows:

$$\text{var } ss6 = ss3 \cdot \text{Query}(q => q \cdot \text{Count}(\ )) \cdot \text{ReDistribute}(\\ ) \cdot \text{Query}(q => q \cdot \text{Sum}(e => e)) \tag{8}$$

where ss6 represents a new dataset generated after a first query operation, a re-distribute operation, and a second query operation is applied to a dataset ss3, the first query operation being a count of data in the dataset, and the second query operation being a sum of data in the dataset.

In such examples, the combined query operations 202 and re-distribute operation 212, to include the summing operation, can dramatically reduce the amount of network traffic, thereby improving the speed of network traffic for other operations.

In various examples, the final transformation can be a re-naming operation 214. The re-naming operation 214 can provide a means by which a current key (e.g., a key from the re-key operation 210) can be included into the payload (e.g., tuple, topic). In some examples, the re-naming operation 214 can be a SelectWithKey operation. In such examples, the re-naming operation 214 can be expressed as follows:

$$ss5 \cdot \text{SelectWithKey}((grp, pay) => \text{new AdCount}\{grp,\\ pay\}), \tag{9}$$

where grp represents a key and pay represents a payload of the shard, and the select with key operation renames the dataset ss5 based on a per AdId count stream, new AdCount.

Figure 3:
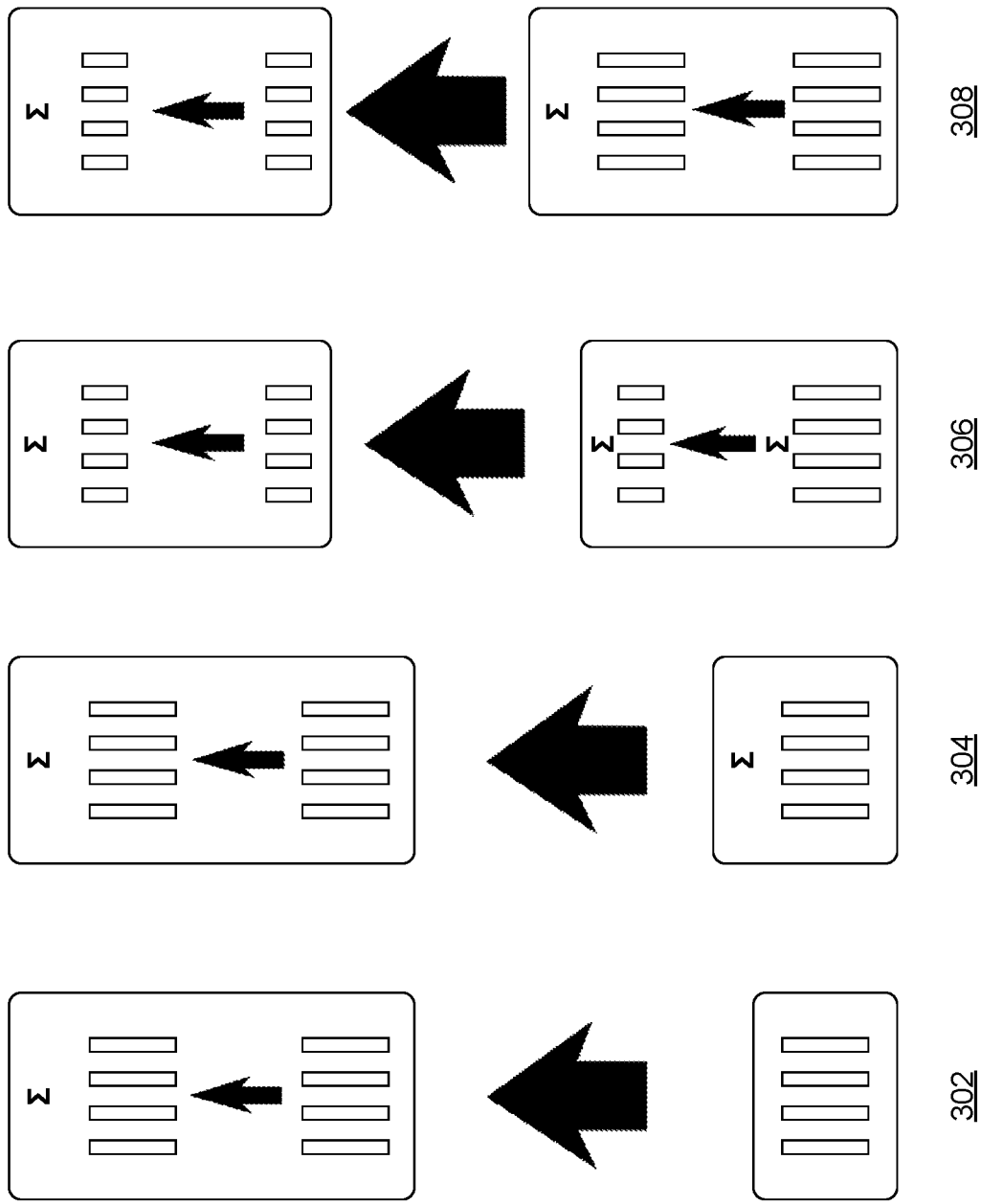
FIG. 3 is a block diagram that illustrates various examples of data movement and aggregation operations.

FIG. 3 is a block diagram that illustrates various examples of data movement and aggregation operations. The example operations at 302, 304, 306, and 308 are provided by way of example, and not limitation. Other operations and combinations thereof are imagined. In various examples, data can be moved and aggregated at different stages to increase efficiency and optimize execution of the query processing and data analysis. In various examples, the movement of data and aggregation can depend on available bandwidth between cores in a machine, between cores in different machines, and/or between nodes in a distributed service platform. In some examples, the movement of data and aggregation can depend on an expense associated with a particular aggregation. In some examples, the movement of data and aggregation can depend on the size and/or number of datasets associated with the query.

As discussed above, data can be moved (e.g., re-distributed) locally (e.g., within a machine) and globally (e.g., across machines). Data aggregation (e.g., executing a calculation on keyed data) can be performed at different stages of the transformation operations, to optimize execution of the query processing and data analysis. In some examples, the data aggregation can occur after data has been re-distributed. For example, FIG. 3 at 302 illustrates a re-distribution across all shards (e.g., globally and locally) followed by an aggregation. The re-distribution and aggregation illustrated at 302 can optimize execution and increase efficiency in the data analysis and query processing for computationally expensive aggregates. The operations at 302 can be expressed as follows:

$$ss3 \cdot \text{ReDistribute}(\ ) \cdot \text{Query}(q => q \cdot \text{Count}(\ )), \quad (10)$$

where ss3 represents the dataset on which the re-distribute operation and query operation are applied, where the query operation input q is modified by a count calculation, q·Count.

In some examples, the data aggregation can occur prior to the re-distribute operation. Additionally, the data aggregation can occur more than once at different stages of the transformation operations. For example, FIG. 3 at 304 illustrates an aggregation followed by a re-distribution across all shards (e.g., globally and locally), followed again by a second aggregation. The re-distribution and aggregations illustrated at 304 can optimize execution and increase efficiency in the data analysis and query processing for a small number of groups (e.g., 4 or fewer). In such an example, because the number of groups is small, the aggregation may be less computationally expensive than shuffling raw data, either across cores or across machines. The operations at 304 can be expressed as follows:

$$ss3 \cdot \text{Query}(q => q \cdot \text{Count}(\ )) \cdot \text{ReDistribute}(\ ) \cdot \text{Query} \\ (q => q \cdot \text{Sum}(e => e)), \quad (11)$$

where ss3 represents the dataset on which the query operation of applying a count q·Count to input q is followed by a global (e.g., across multiple machines) re-distribute operation, which is followed by a second query operation of applying a sum q·Sum to the input q.

In various examples, multiple aggregations can occur before and after re-distribute operations. In such examples, the query processing and data analytics can be optimized for an intermediate number of groups, where the likelihood of keys duplicated across the cores of a machine is high and re-aggregation within a machine before the global data movement would optimize network bandwidth usage. For example, as illustrated at 306, an aggregation is followed by a local re-distribute (e.g., across shards in a particular machine), followed by a second aggregation, such as a summing operation. After the second aggregation, the shards of data can be re-distributed across all shards (e.g., globally and locally), and then a third aggregation, such as a final sum can be calculated. The operations at 306 can be expressed as follows:

$$ss3 \cdot \text{Query}(q => q \cdot \text{Count}(\ )) \cdot \text{ReDistribute(Local(} \\ )) \cdot \text{Query}(q => q \cdot \text{Sum}(e => e)) \cdot \text{ReDistribute(} \\ )) \cdot \text{Query}(q => q \cdot \text{Sum}(e => e)), \quad (12)$$

where ss3 represents the dataset on which the query operation of applying a count q·Count to input q is followed by a local (e.g., within a single machine) re-distribute operation, followed by a second query operation of applying a sum q·Sum to the input q, followed by a global (e.g., across multiple machines) re-distribute operation, followed by another sum q·Sum to the input q.

As illustrated at 308, a first aggregation can occur after a first local re-distribute, and again after a second redistribute across all shards (e.g., globally and locally). The operations at 308 can be expressed as follows:

$$ss3 \cdot \text{ReDistribute(Local(} )) \cdot \text{Query}(q => q \cdot \text{Count}(\ )) \cdot \text{ReDistribute(} ) \cdot \text{Query}(q => q \cdot \text{Sum}(e => e)), \quad (13)$$

where ss3 represents the dataset on which a local re-distribute operation is applied, followed by a first query operation of applying a count q·Count to an input q, followed by a second query operation of applying a sum q·Sum to the input q.

In such examples, the query processing and data analytics can be optimized for a large number of groups, where the memory cost of an aggregation prior to the first local re-distribute (e.g., building a hash table per core) would be very expensive, and the benefit to such aggregation would be negligible.

Figure 4:
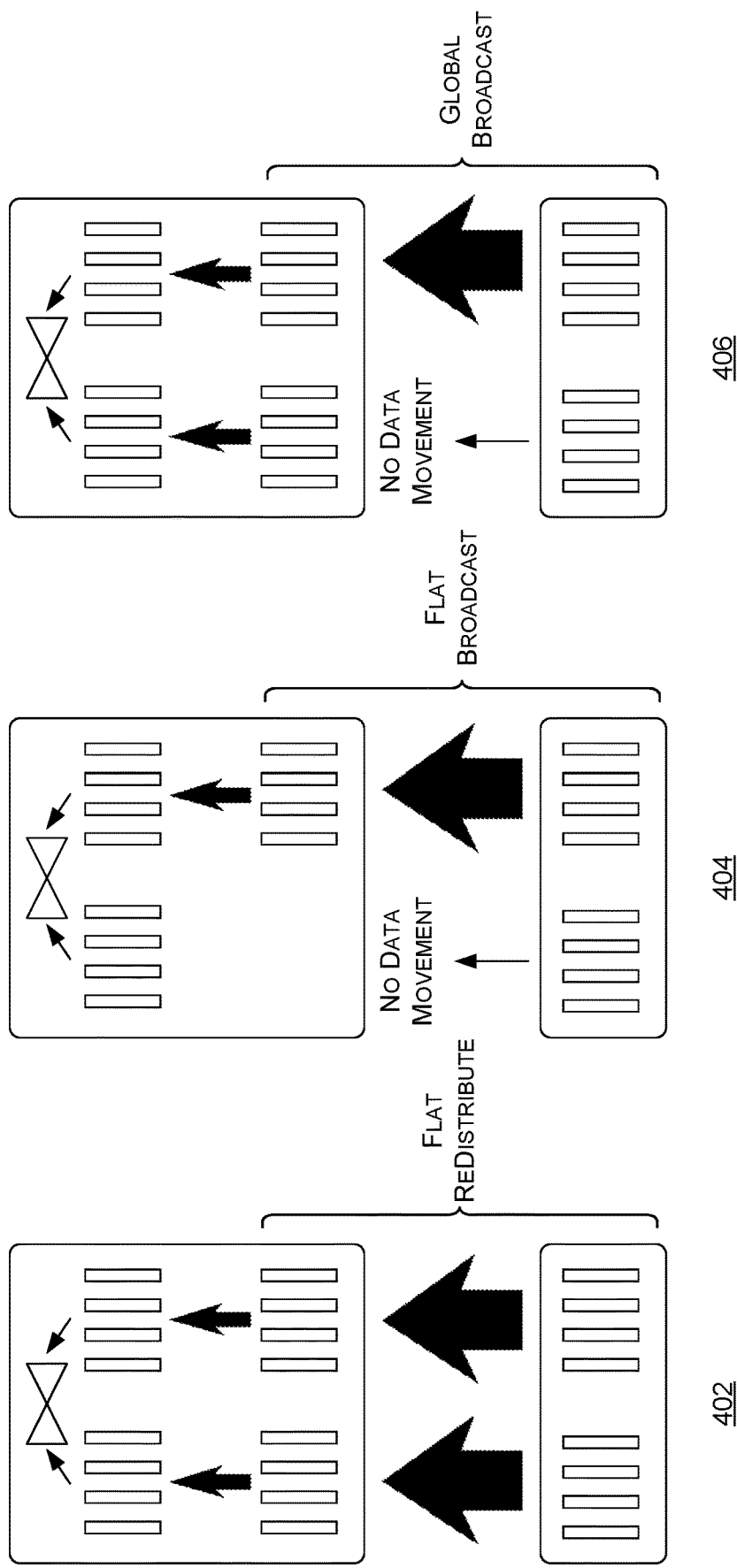
FIG. 4 is a block diagram that illustrates various examples of data movement and join operations.

FIG. 4 is a block diagram that illustrates various examples of data movement and join operations. The join operation can be a hash-join or a broadcast join. The join operation can be local (intra-machine) or global (inter-machine). The example operations at 402, 404, and 406 are provided by way of example, and not limitation. Other operations and combinations thereof are imagined. In various examples, data can be moved and shards of data can be joined at different stages to increase efficiency and optimize execution of the query processing and data analysis.

In some examples, the movement of data and join operations can depend on available bandwidth between cores in a machine, between cores in different machines, and/or between nodes in a distributed service platform. In some examples, the movement of data and join operations can depend on a complexity involved in a particular join operation.

As illustrated at 402, a join operation can occur after a flat re-distribution across all shards of data (e.g., globally and locally). In such an example, the shards of data can be re-keyed locally and re-distributed globally across machines. The shards of data can then be re-keyed in the new locations, and re-distributed locally based on the re-key operation. Following the local re-distribution, the shards of data can be combined in a join operation. The operations at 402 can be expressed as follows:

$$ss2 = \text{ReKey}(e => e \cdot \text{AdId}) \cdot \text{ReDistribute}(\ ) \cdot \text{ReKey} \\ (e => e \cdot \text{AdId}) \cdot \text{ReDistribute} \cdot \text{Query}(d2,(l,r) => l \cdot \text{Join} \\ (r, \ldots\ )), \quad (14)$$

where ss2 represents a resulting dataset from transformation operations being applied to dataset d2, including joining a left shard of data "l" and a right shard of data "r."

As illustrated at 404, one or more shards in a first machine can be flat broadcasted based on a re-key operation. After the flat broadcast, the one or more shards can be joined to one or more other shards of data. The operations at 404 can be expressed as follows:

$$ss2 = \text{ReKey}(e => e \cdot \text{AdId}) \cdot \text{ReKey}(e => e \cdot \text{AdId}) \cdot \text{Broadcast}(\ ) \cdot \text{Query}(d2,(l,r) => l \cdot \text{Join}(r, \ldots\ )), \quad (15)$$

where ss2 represents a resulting dataset from transformation operations being applied to dataset d2, including a local broadcast join of a selected shard of data "l" being joined to a particular shard of data "r."

As illustrated at 406, one or more shards of data can be globally broadcasted across machines, and thus can duplicate the right input on each of the machines. After the global broadcast, a join operation, such as a hash-join can be executed within each machine. In some examples, the hash-join after the global broadcast can be executed so that a larger side of the join is not moved across machines, thereby saving expenses associated with large data movements. Additionally, one or more probe hash tables within each machine can be partitioned across shards. The operations at 406 can be expressed as follows:

$$ss2 = \text{ReKey}(e => e \cdot \text{AdId}) \cdot \text{ReDistribute}(\text{Local}) \cdot \text{ReKey}(e => e \cdot \text{AdId}) \cdot \text{Broadcast}(\text{Global}) \cdot \text{Redistribute}(\text{Local}) \cdot \text{Query}(d2, (l,r) => l \cdot \text{Join}(r, \ldots)), \quad (16)$$

where ss2 represents a resulting dataset from transformation operations being applied to dataset d2, including performing a broadcast join of a reference dataset to a first dataset, followed by a local re-distribute and query operation on dataset d2, including joining a left shard of data "l" and a right shard of data "r."

As discussed above, the operations at 402, 404 and 406 are but a few illustrations of a myriad distributed join strategies. It is understood that other distributed join strategies may be used depending on the size of the datasets, number of datasets, bandwidth between cores and/or nodes, and other factors that may influence the efficiency of the query processing and data analytics system. Further, the operations listed above—while possibly expressed in a high-level language such as C #—can be executed in a highly efficient batched columnar fashion.

Figure 5:
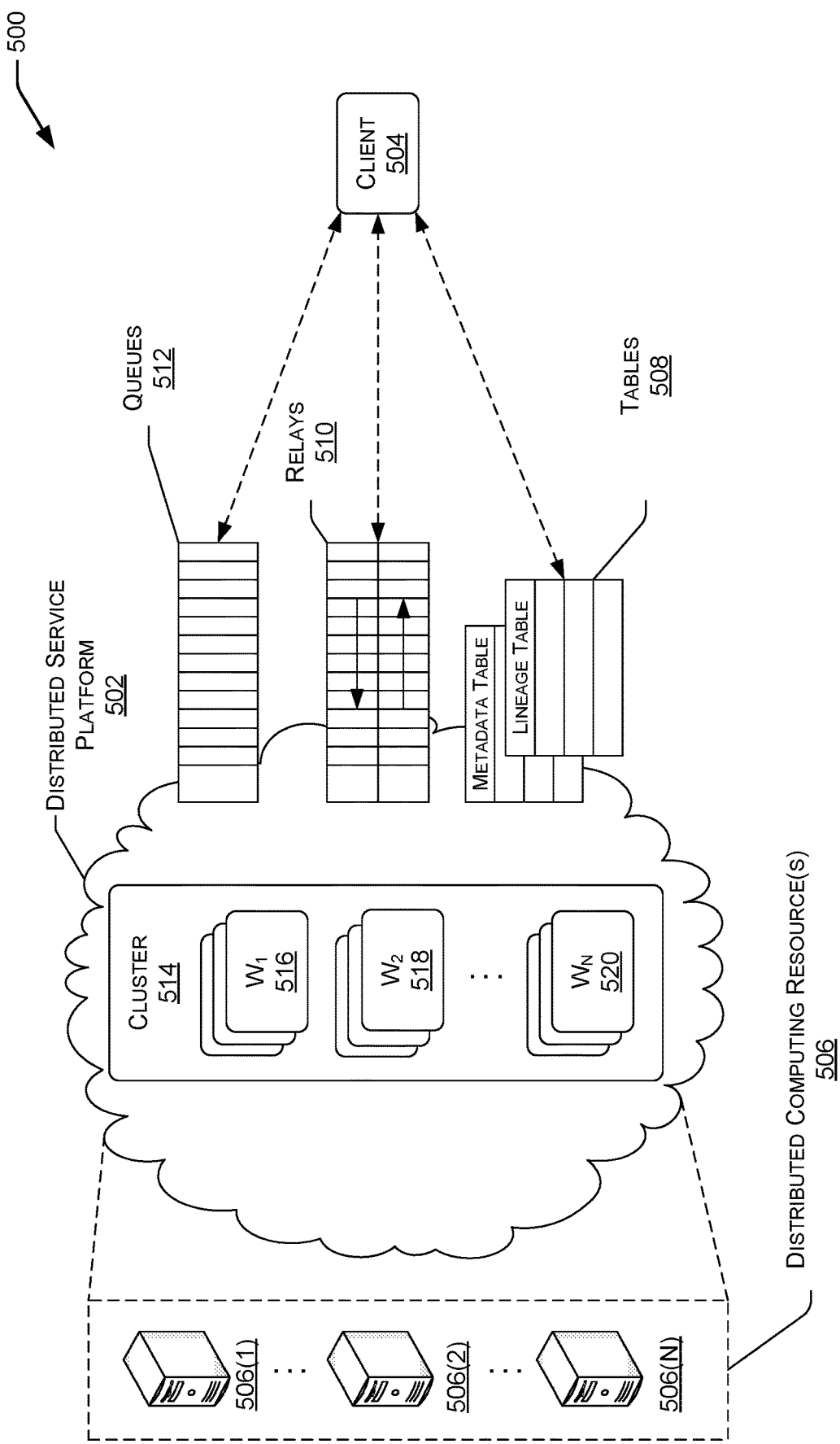
FIG. 5 illustrates an example architecture of a distributed service platform configured to operate with a query processing and data analytics platform.

FIG. 5 illustrates an example architecture 500 of a distributed service platform 502 configured to operate with a data analytics processing platform. The data analytics processing platform can be located at the client 504. In various examples, the client 504 can be a computing device, such as computing device 102. In such examples, the client 504 can be configured to manage and query datasets in the distributed service platform 502. In various examples, the distributed service platform 502 can comprise a pay-as-you go cloud vendor (e.g., WINDOWS AZURE, Google Compute Engine, THE RACKSPACE OPEN CLOUD, IBM SMARTCLOUD, or other IaaS provider).

The client 504 can manage and query datasets via one or more workers in the distributed computing resources 506. As such, the control flow communication can occur through decentralized and replicated resources, thereby increasing redundancy in the query processing and data analytics system. The resources can include, but are not limited to tables 508 that implement a key/value store, one or more queues 510 that expose a FIFO message abstraction, relays 512 that implement the publish/subscribe paradigm of a topic-based message broadcast, and/or other resources necessary for identification of datasets and transformation operations thereon.

The client 504 can communicate with the one or more workers in the distributed computing resources 506 to perform various functions. The functions can include, but are not limited to, manipulating clusters (e.g., to create, provision, scale up/down, decommission clusters on-demand, etc.), working with datasets (e.g., to create datasets, search for datasets, share datasets, delete datasets), and queuing tasks for workers to perform (e.g., delineating transformation operations to be performed on the datasets). Responsive to instructions from the client 504, the one or more workers can manage the inter-node network communication, enable query processing, and provide feedback on progress and/or errors to the client 504 via the resources. In various examples, the feedback and/or error reporting can be communicated to a user via an input/output interface on the computing device associated with the client 504. Illustrative examples of the various functions are shown in Tables 1 and 2, below.

TABLE 1

```
//Application 1
var cluster1 = Quill.createCluster(new Nodes [10] { ... });
var adInfo = Quill.createDataset <AdInfo> ("/data/hdfs/adinfo",
   cluster1).ToMemory( );
var counts = adInfo.ReKey(e => e.AdId).ReDistribute( ).Query(e =>
   e.Count( ));
var cluster2 = Quill.createCluster(new Nodes[2] { ... });
counts.ReDistribute(cluster2).ToMemory("adcounts");
Quill.removeDataset(adInfo);
Quill.removeDataset(adInfo);
Quill.tearDown(cluster1);
```

TABLE 2

```
//Application 2
var counts = Quill.searchDataset ("adcounts");
counts.Subscribe(e => Console.WriteLine(e));
```

In various examples, the client 504 can create and provision one or more workers for analytics. In such examples, the one or more workers can be organized into a virtual cluster 514, such as $W_1$ 516-$W_N$ 520, of distributed computing resources 506. Each virtual cluster 514 can represent groups of machines that can operate as a single unit. In various examples, each virtual cluster 514 can be associated with a broadcast topic ("topic") in the pub/sub relay. The topic can be a payload of shards of data in the virtual cluster. In such examples, the one or more workers in the virtual cluster 514 can be assigned the topic from the pub/sub relay. In some examples, each virtual cluster $W_1$ 516-$W_N$ 520 can be associated with a particular name.

As discussed above, the client 504 can delete a cluster, such as through a "teardown" command. Additionally, the client 504 can re-size a particular virtual cluster, such as $W_2$ 518, by creating a new virtual cluster $W_N$ 520, of a desired size, moving data sets, such as through a re-shard or re-distribute operation, and deleting the original virtual cluster $W_2$ 518. In various examples, the virtual clusters 514 can serve as location descriptors for data movement operations, such as the data movement operations described above with respect to FIGS. 3 and 4.

In various examples, data related to the virtual clusters 514 (e.g., number of distributed computing resources, distributed computing resources associated with the virtual cluster, etc.) can be stored in the tables 508. In at least one example, the data can be stored in a metadata table. Additionally, the metadata table in the tables 508 can store metadata associated with disk datasets (e.g., a dataset that points to a path in the distributed service platform) and in-memory datasets (e.g., a dataset that is persisted in distributed main memory) associated with the query processing and data analytics platform. In various examples, the metadata stored in the tables 508 can be accessible by the client 504, such as for search operations and/or to create new datasets for query processing and data analysis. In some examples, clients 504 can also delete datasets and reclaim memory. For example, as illustrated above in Table 1, Application 1 creates a DiskDataset, loads the DiskDataset into a 10 machine virtual cluster as an InMemDataset (e.g, in memory dataset), and subsequently deletes it. A resultant dataset, named "adcounts" is later retrieved and used by Application 2 illustrated in Table 2. In other examples, the virtual cluster can include a different number of machines, such as 5, 20 or 23 machines. The use of such distributed resources (such as cloud tables) for coordination has the benefit of not requiring a "master node" that can serve as a single point of failure for the distributed system. Furthermore, such distributed resources generally come with built-in high-availability guarantees that are required for such a system.

Responsive to the datasets being retrieved and stored in the cluster 514, the client 504 can perform analysis queries (e.g., transformation operations). In some examples, an operation can be sent to the virtual cluster as a single task by the client 504. For example, transformation operations are pipelined and sent as a single task. A task is a unit of work sent from the client 504 to the one or more workers in the virtual cluster 514, and may represent an intra-node physical sub-plan. The tasks together can represent a distributed physical plan. As discussed above, the distributed physical plan can be based on bandwidth between nodes, expense of computations, a number of machines in the cluster, a number of datasets, and the like. The client 504 can send each task to the one or more workers via the relays 510.

In various examples, the transformation operations can be tracked in the tables 508. In at least one example, the transformation operations can be stored in a LineageTable. In some examples, the tables 508 can be used when a node fails, in order to re-do operations on data that was stored in the failed node. In various examples, the MetadataTable of the tables 508 can be updated to reflect the new locations of restored dataset shards.

In various examples, the distributed physical plan can be based on network connections between distributed computing resources 506 in the clusters 514. In such examples, a sender distributed computing resource, such as distributed computing resource 506(1) can create a TCP endpoint and store connection data in a table 508. A receiver distributed computing resource, such as distributed computing resource 506(2), can read the connection data to instantiate connection requests. Once connections are established between distributed computing resources 506, the connections are cached to facilitate subsequent data movement. In some examples, the sender distributed computing resource 506(1) can write a transformed dataset to the set of network connections, such as by a ToBinaryStream command. In various examples, the receiver distributed computing resource 506(2) can assemble the data from the set of network connections into a resultant dataset, such as by a FromBinaryStream command.

In various examples, datasets can be split to reside in multiple storage accounts. In such examples, the system may be capable of a higher read bandwidth. The client 504 can determine a location in storage of each of the different shards of the dataset. The client 504 can send the information as a load task to the queues 512 as a work queue. The one or more workers can read the load tasks from the queues 512, and load data using multiple threads. In various examples, the data loading progress can be tracked and reported to the client 504 via the queues 512, such as via a completed task queue.

In some examples, an operation can be sent to the virtual cluster as two tasks, a first for the sender and a second for the receiver. For example, data movement operations, such as a Re-Distribute operation, break the pipeline into two separate and distinct tasks, and send the tasks to the appropriate virtual cluster 514. In some examples, the sender and receiver of the data movement operation can be the same virtual cluster 514, such as $W_1$ 516. In other examples, the sender and the receiver of the data movement operation can be different virtual clusters, such as $W_1$ 516 and $W_N$ 520.

In various examples, the client 504 can serialize and publish tasks associated with operations to the relays 510 based upon the appropriate topic. The one or more workers subscribed to the topic (e.g., a worker assigned to the virtual cluster associated with the topic) can receive and execute the tasks as appropriate. The one or more workers can document completion of the task. In some examples, the documentation of task completion can be stored in the key/value store in the tables 508 with an identification of the worker that completed the task. In such examples, the client 504 can reference the tables 508 to update progress on various tasks. Additionally, the client 504 can determine that a query is complete when the key/value store in the tables 508 contains the identification of each of the one or more workers in the virtual cluster 514.

Additionally, the client 504 can track query errors (e.g., failed tasks due to malformed input data, bugs in client queries, etc.) through the queues 512, such as via an error queue. In some examples, the one or more workers can send error information to the queues 512 via a special error message. In such examples, the client 504 can access the special error message and surface the error.

Figure 6:
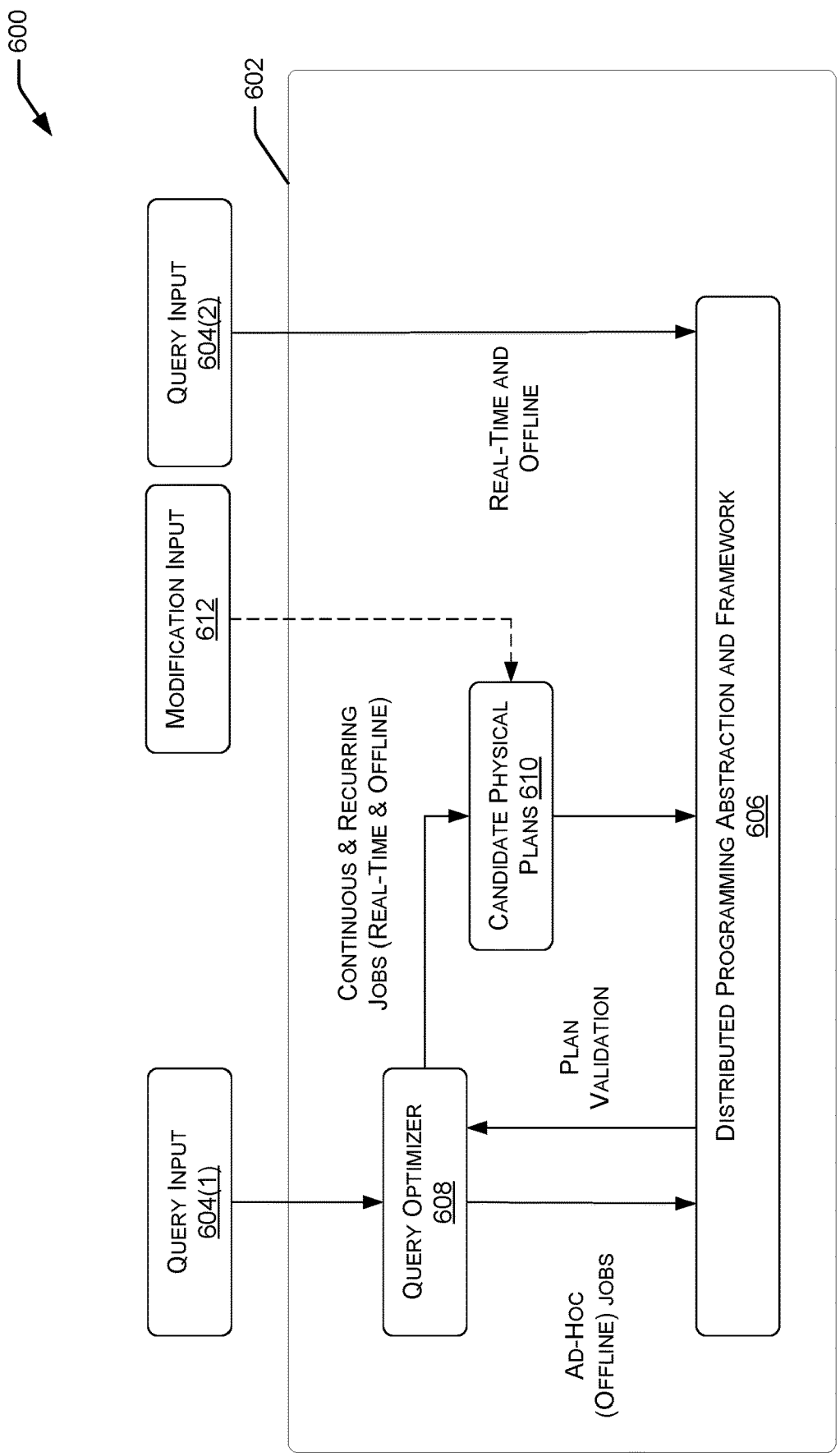
FIG. 6 is a block diagram that illustrates an analytics workflow of a query processing and data analytics system.

FIG. 6 is a block diagram that illustrates an analytics workflow 600 of a query processing and data analytics system. In various examples, a computing device 602, such as computing device 102 can receive a query input 604. The query input 604 can be in the form of a structured query language (SQL), a temporal SQL, or other database query language. In some examples, the query input 604 can be a declarative query.

As described above with regard to FIG. 2, the computing device 602 can receive the query input 604(2) into a distributed programming abstraction and framework 606. In such examples, the query input 604(2) can be applied to real-time data and/or offline temporal-relational data.

In various examples, the computing device 602 can receive the query input 604(1) into a query optimizer 608. In such examples, the query optimizer 608 can generate one or more candidate physical plans 610. A candidate physical plan 610 (e.g., a distributed physical plan) can be a series of steps for processing the query input 602. The series of steps can include, but are not limited to query operations, operations described above with regard to FIGS. 3-5 (e.g., re-distribution operations, re-keying operations, join operations, count operations, sum operations, select with key operations, virtual worker instructions, and the like.)

In some examples, the one or more candidate physical plans 610 can be based on one or more factors, such as available bandwidth between machines, available bandwidth between cores, a size of an input dataset, a current distribution of an input dataset, etc. In some examples, the one or more candidate physical plans 6\10 can be based on a nature of the job, such as a continuous and/or recurring job applied to real-time data and/or offline temporal relational data.

In various examples, the computing device 602 may receive a modification input 612. The modification input 612 can be a selection of and/or a modification to one or more candidate physical plans 610. In some examples, the modification input 612 can request a plan validation of the candidate physical plan 610 against the query optimizer 608 via the distributed programming abstraction and framework 606. In such examples, the candidate physical plan 610 can be validated and vetted prior to implementation.

In some examples, the query optimizer 608 can receive the query input 604(1) comprising an ad-hoc (offline) job. In such examples, the query optimizer 608 can send the input directly to the distributed programming abstraction and framework 606 for processing. The distributed programming abstraction and framework 606 can process transformation operations and generate datasets in order to execute the analytics workflow of a query processing and data analytics system.

Illustrative Processes

FIGS. 7-10 are flow diagrams depicting example processes for query processing and data analytics. The operations of the example process are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes.

Figure 7:
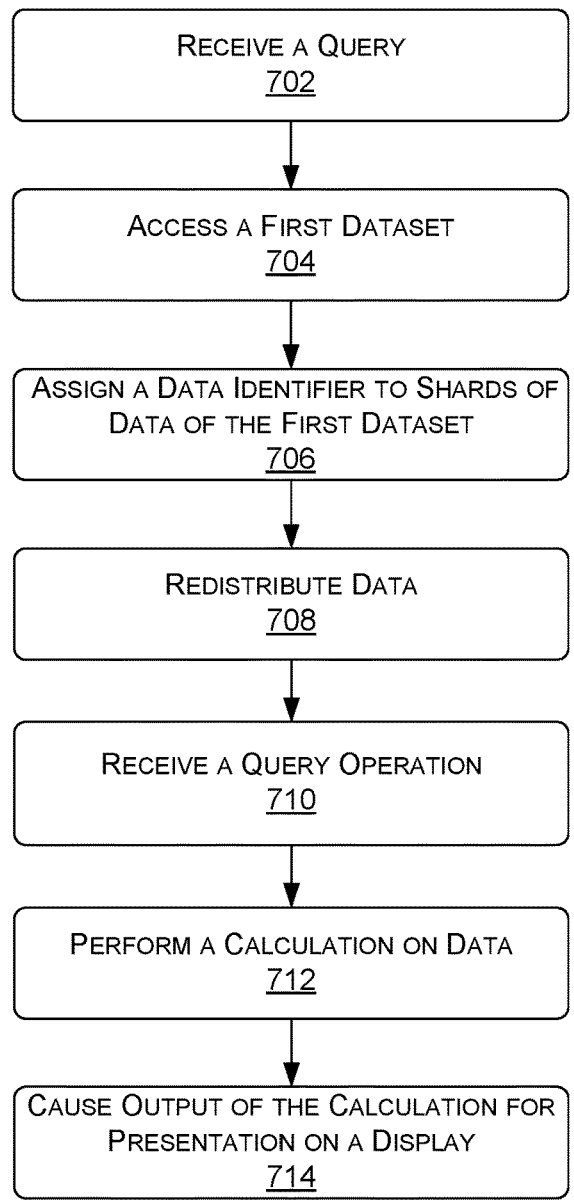
FIG. 7 is a flow diagram that illustrates an example process flow of a query processing and data analytics platform.

FIG. 7 is a flow diagram that illustrates an example process flow 700 of a query processing and data analytics platform.

At 702, a computing device, such as computing device 102, can receive a query. In various examples, the query can be input via one or more input/output devices of the computing device. The query can be in the form of a question, a statement of desired analytics, a query operation, a coded instruction, a query topic, or the like. In various examples, the computing device can process the query via an HLL integrated query processing and data analytics system (e.g., a client library). As an illustrative example, a user may input a query such as "determine a number of hits on a particular website per hour."

At 704, the computing device can access a first dataset. The first dataset can be accessed based at least in part on the query input at 702. In various examples, the dataset can include one or more shards of data. The data in the shard can be stored in the dataset in time-stamped order. In some examples, the data in each shard can be related data (e.g., a same or similar topic). In some examples, the data in each shard can be randomly stored (e.g., different topics). Following the example above, the first dataset can include data associated with the particular website.

In various examples, the first dataset can be one of a plurality of datasets accessed by the computing device. The first dataset and/or the plurality of datasets can be stored on a single core or across multiple cores of a machine. In some examples, the first dataset and/or the plurality of datasets can be stored across a plurality of nodes, such as in a distributed service platform.

At 706, the computing device can assign a data identifier (e.g., a key) to shards of data of the first dataset. The data identifier can be assigned to individual shards of data in the dataset. In examples with a plurality of datasets, the computing device can assign a data identifier to each of the shards of data in each dataset. In some examples, each shard of data in the first dataset can be associated with a different data identifier. In other examples, two or more shards can be associated with the same data identifier. The data identifier can be assigned based on a topic of the shard of data. For example, a shard of data with information related to website identifications can be assigned "WebsiteId" as a data identifier.

At 708, the computing device can redistribute data across various shards of data. In some examples, the movement of data can be based on a re-distribute operation input via one or more input/output devices of the computing device. In various examples, the computing device can redistribute data by moving data across shards in a same machine so that same key resides in each shard. In some examples, the computing device can redistribute data by moving data across shards in different machines so that same key resides in each shard. The specific movement of data can be determined based at least in part on the bandwidth between cores of a machine, between machines, and/or between nodes of a distributed service platform.

At 710, the computing device can receive a query operation. In various examples, the query operation can be input via the one or more input/output devices of the computing device. In some examples, the query operation can be related to the query input at 702. For example, following the example above, a user who wants to determine how many hits occur on a website may input a query operation such as a count operation, to count the number of hits stored on data in the dataset.

At 712, the computing device can perform a calculation on data based at least in part on the query operation. For example, the computing device may calculate the count per website at 712. In various examples, one or more other calculations can be performed on data, prior to the calculation at 712, such as before the redistribution of data. For example, a count operation may be performed on shards of data prior to the redistribution, and may be followed by a sum operation at 712.

At 714, the computing device can cause an output of the calculation for presentation on a display of the computing device. In various examples, the aggregation can be the basis of the query input at 702. Following the example from above, the aggregation can be the total number of hits on the particular website.

Additionally, the computing device 102 can cause one or more actions to be conducted on the transformation results. The one or more actions can be used to materialize query results, such as materializing the transformation results into a main memory (e.g., store computation to a potentially distributed in-memory dataset), to a specified path (e.g., store the results in a persistent data store), to an input/output stream (e.g., take an array of I/O streams as parameter and output each shard in an efficient binary format to the corresponding I/O-stream in the array), and/or to accept specific instructions to operate directly on the results.

Figure 8:
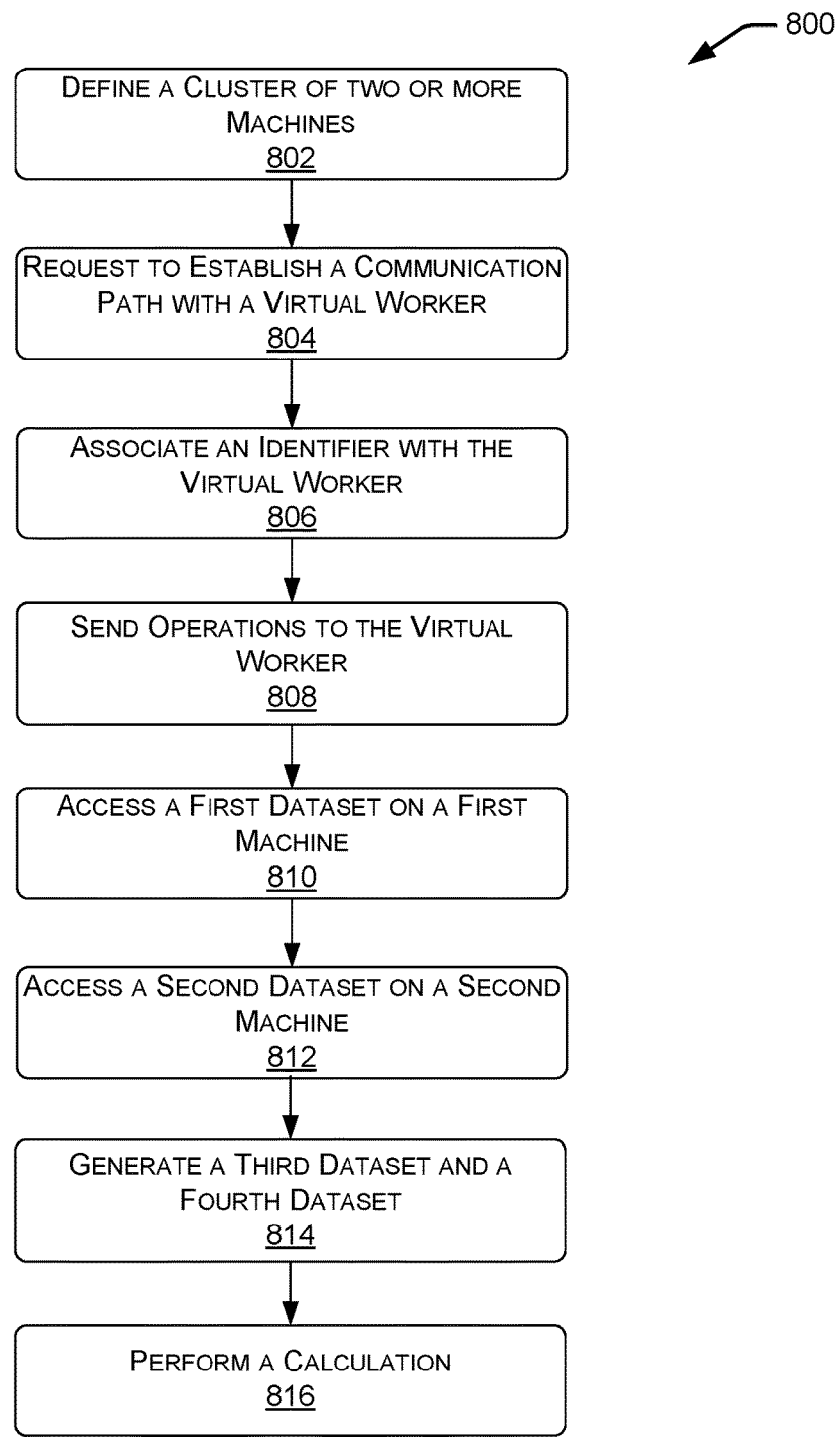
FIG. 8 is a flow diagram that illustrates an example process flow of a query processing and data analytics platform communicating with a distributed service platform.

FIG. 8 is a flow diagram that illustrates an example process flow 800 of query processing and data analytics platform communicating with a distributed service platform.

At 802, a computing device can define a cluster of two or more machines (e.g., nodes) in a distributed service platform. In some examples, the computing device can define two or more clusters. In various examples, the two or more machines can be selected for the cluster based at least in part on one or more datasets stored therein. In some examples, the cluster can be defined (e.g., machines selected and grouped together) based on a query. In various examples, the query can be input via one or more input/output devices of the computing device. The query can be in the form of a question, a statement of desired analytics, a query operation, a coded instruction, a query topic, or the like. In various examples, the computing device can process the query via an HLL integrated query processing and data analytics system (e.g., a client library) via a cloud data analytics system (e.g., a cloud library).

At 804, the computing device can request to establish a communication path with a virtual worker. In various examples, the virtual worker can be a worker entity associated with one or more machines in a particular cluster. In some examples, the virtual worker can be the worker entity that executes tasks assigned by the computing device, such as via the communication path. The communication path can be a two-way communication path configured to support sending and receiving instructions and data. The communication path can be via one or more networks. In various examples, the virtual worker can receive instructions from the computing device via the communication path, and can execute the instructions as necessary in the cluster.

At 806, the computing device can associate an identifier with the virtual worker. In various examples, the identifier can be based at least in part on data in the datasets associated with the machines in the cluster. In such examples, the identifier can be based on a payload associated with shards of data in the datasets.

At 808, the computing device can send transformation operations to the virtual worker. In various examples, the computing device can cause the virtual worker to execute transformation operations. The transformation operations can include query operations, re-shard operations (e.g., round-robin movement of shard contents to achieve equal shard sizes), broadcast operations (e.g., duplicate shard content across all of the shards), re-key operations (e.g., change the key associated with each row in each shard), re-distribute operations (e.g., move data across shards in a same machine so that same key resides in each shard, move data across shards in different machines so that same key resides in each shard), and re-naming operations (e.g., construct new payload on each shard). Multicast is a powerful data movement operation that sends each tuple in each input shard to zero or more result shards, based on a user-provided lambda expression over the payload. Using Multicast, one can selectively replicate tuples to result shards to implement theta-joins, parallel multi-way joins, and matrix operations, spatio-temporal computations, etc. In various examples, the transformations may include one or more of each of the above listed operations. In some examples, the transformations may include one or more of a sub-set of the above listed operations. For example, the transformations can include a query operation, a re-key operation and a re-distribute operation. For another example, the transformations can include a query operation, a broadcast operation, a re-key operation and a re-distribute operation.

At 810, the computing device can access a first dataset on a first machine. In various examples, the computing device can access the first dataset via the virtual worker. The first dataset can be accessed based at least in part on a query. In various examples, the first dataset can include one or more shards of data. The data in the shard can be stored in the first dataset in time-stamped order. In some examples, the data in each shard can be related data (e.g., a same or similar topic). In some examples, the data in each shard can be randomly stored (e.g., different topics). The first dataset can be stored on a single core or across multiple cores of a machine in the cluster.

At 812, the computing device can access a second dataset on a second machine. In various examples, the computing device can access the second dataset via the virtual worker. In various examples, the computing device can access the second dataset via the virtual worker. The second dataset can be accessed based at least in part on the query. In various examples, the second dataset can include one or more shards of data. The data in the shard can be stored in the second dataset in time-stamped order. In some examples, the data in each shard can be related data (e.g., a same or similar topic). In some examples, the data in each shard can be randomly stored (e.g., different topics). The second dataset can be stored on a single core or across multiple cores of a machine in the cluster.

At 814, the computing device can generate a third dataset and a fourth dataset. In various examples, the computing device can cause the third dataset and the fourth dataset to be generated by the virtual worker. In some examples, the third dataset and the fourth dataset can be generated by redistributing data. Data can be distributed across machines and/or across cores of a machine.

In some examples, a data redistribution can be based, at least in part, on a data identifier (e.g., a re-key operation) being assigned to each of the shards of data of the first dataset and the second dataset. In such examples, the computing device can cause the virtual worker to assign the respective data identifiers. The shards of data in respective datasets can be assigned different identifiers. In some examples, two or more shards of data in the respective datasets can have the same data identifier. In various examples, the data identifier can be assigned based on a topic of the shard of data. For example, a shard of data with information related to user identifications can be assigned "UserId" as a data identifier.

In some examples, the third dataset and/or the fourth dataset can be stored as a disk dataset. In such examples, the stored disk dataset can point to a path in the distributed service platform storage. In some examples, the third and/or the fourth dataset can be stored as to a main memory of a machine of the distributed service platform. Regardless of the storage, the third dataset and the fourth dataset can be stored to be accessible in future query processing and data analytics.

At 818, the computing device can perform a calculation on the third dataset and the fourth dataset. In various examples, the computing device can cause the virtual worker to perform the calculation. In such examples, the computing device can cause the virtual worker to perform the calculation by sending a query operation to the virtual worker via the communication path. For example, the computing device can send a query operation to count a number of UserIds present in a dataset.

In various examples, the computing device can cause the virtual worker to perform more than one calculation. In such examples, the calculations can be performed consecutively, or spaced out with other operations in between. For example, a first calculation can be performed prior to generating the third dataset and the fourth dataset, and a second calculation can be performed on the third dataset and the fourth dataset.

FIG. 9 is a flow diagram that illustrates an example process flow 900 of a query processing and data analytics platform.

At 902, the computing device can access a first dataset. The first dataset can be accessed based at least in part on a query (e.g., a question, a statement of desired analytics, a query operation, a coded instruction, a query topic, or the like). In various examples, the dataset can include one or more shards of data. The data in the shard can be stored in the dataset in time-stamped order. In some examples, the data in each shard can be related data (e.g., a same or similar topic). In some examples, the data in each shard can be randomly stored (e.g., different topics). Following the example above, the first dataset can include data associated with the particular website.

In various examples, the first dataset can be one of a plurality of datasets accessed by the computing device. The first dataset and/or the plurality of datasets can be stored on a single core or across multiple cores of a machine. In some examples, the first dataset and/or the plurality of datasets can be stored across a plurality of nodes, such as in a distributed service platform.

At 904, the computing device can apply a first query operation to the first dataset. In various examples, the first query operation can be input via the one or more input/output devices of the computing device. In some examples, the query operation can be related to an overall query. In some examples, the query operation can be a first aggregation on data in the dataset. For example, a user who wants to determine how many hits occur on a web site may input a query operation such as a count operation, to count the number of hits stored on data in the dataset.

At 906, the computing device can assign a data identifier (e.g., a key) to each shard in the first dataset. The data identifier can be assigned to individual shards of data in the dataset. In examples with a plurality of datasets, the computing device can assign a data identifier to each of the shards of data in each dataset. In some examples, each shard of data in the first dataset can be associated with a different data identifier. In other examples, two or more shards can be associated with the same data identifier. The data identifier can be assigned based on a topic of the shard of data. For example, a shard of data with information related to website identifications can be assigned "WebsiteId" as a data identifier.

At 908, the computing device can redistribute data in the first dataset across various shards of data. In some examples, the movement of data can be based on a re-distribute operation input via one or more input/output devices of the computing device. In various examples, the computing device can redistribute data by moving data across shards in a same machine so that same key resides in each shard. In some examples, the computing device can redistribute data by moving data across shards in different machines so that same key resides in each shard. The specific movement of data can be determined based at least in part on the bandwidth between cores of a machine, between machines, and/or between nodes of a distributed service platform.

At 910, the computing device can perform a calculation on the third dataset. In various examples, the calculation can be based on a second query operation. In some examples, one or more other calculations can be performed on data, prior to the calculation at 910, such as before the redistribution of data at 908 or at the first query operation at 904. For example, a count operation may be performed on shards of data prior to the redistribution, and may be followed by a sum operation at 910.

At 912, the computing device can output a result of the calculation for presentation on a display of the computing device. In various examples, the calculation can be the basis of the overall query.

Additionally, the computing device can cause one or more actions to be conducted on the transformation results. The one or more actions can be used to materialize query results, such as materializing the transformation results into a main memory (e.g., store computation to a potentially distributed in-memory dataset), to a specified path (e.g., store the results in a persistent data store), to an input/output stream (e.g., take an array of I/O streams as parameter and output each shard in an efficient binary format to the corresponding I/O-stream in the array), and/or to accept specific instructions to operate directly on the results.

Figure 10:
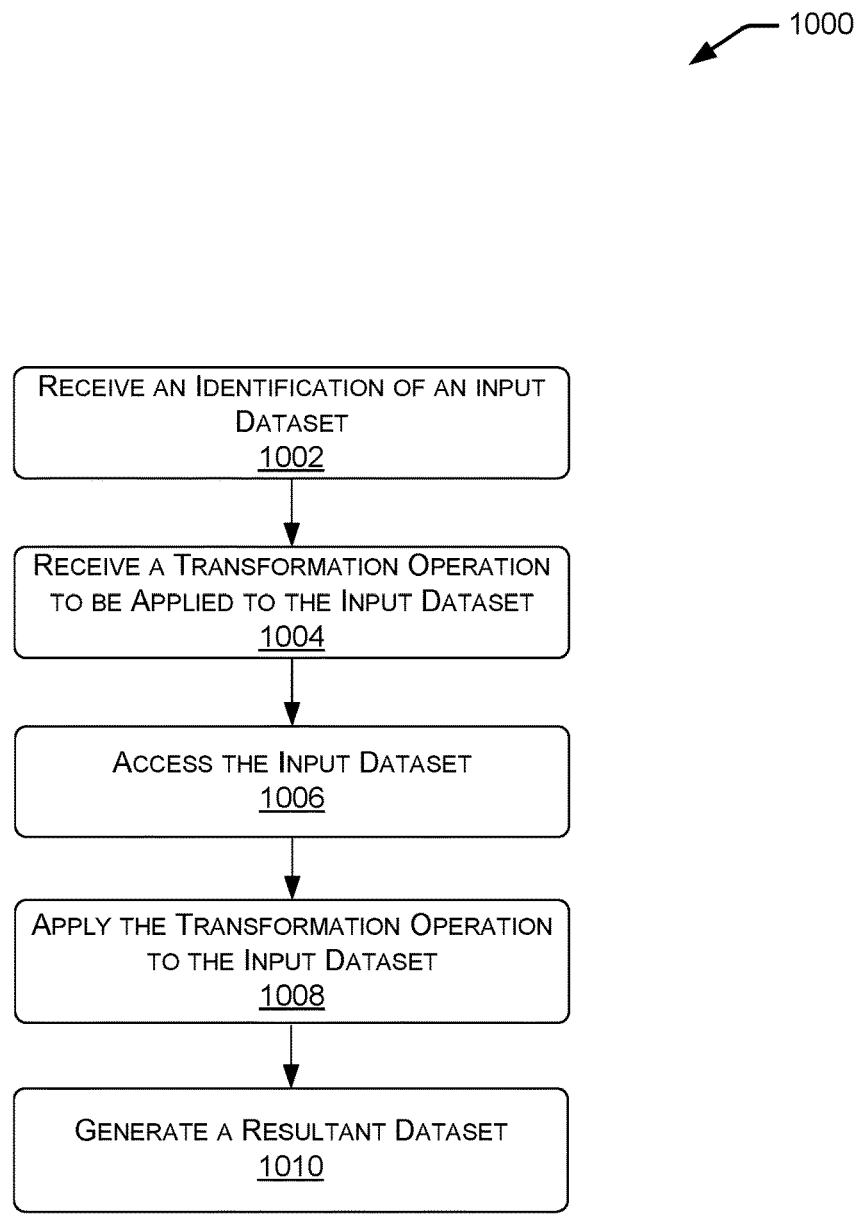
FIG. 10 is a flow diagram that illustrates an example process flow of a query processing and data analytics platform.

FIG. 10 is a flow diagram that illustrates an example process flow 1000 of a query processing and data analytics platform.

At 1002, the computing device can receive an identification of an input dataset. The input dataset can be stored on a single machine, a single core of a machine, across multiple cores of a machine, across multiple machines, across multiple cores in multiple machines, and/or across one or more nodes of a distributed service platform. The identification of the input dataset can comprise a name associated with the input dataset, a topic associated with the input dataset, a time period specified for data stored in the input dataset, and the like.

In various examples, the input dataset can include one or more shards of data. The data in the shard can be stored in the input dataset in time-stamped order. In some examples, the data in each shard can be related data (e.g., a same or similar topic). In some examples, the data in each shard can be randomly stored (e.g., different topics).

At 1004, the computing device can receive a transformation operation to be applied to the input dataset. The transformation operations can include a query operation (e.g., a query comprising transferable computation logic), a re-key operation (e.g., change the key associated with each row in each shard), a data movement operation (e.g., a re-distribution operation, such as to move data across shards in a same machine so that same key resides in each shard, move data across shards in different machines so that same key resides in each shard). In some examples, the transformation operation can include a re-shard operation (e.g., round-robin movement of shard contents to achieve equal shard sizes), a broadcast operation (e.g., duplicate shard content across all of the shards), and/or a re-naming operation (e.g., construct new payload on each shard).

Additionally, the transformation operation can include a multicast operation. Multicast is a powerful data movement operation that sends each tuple in each input shard to zero or more result shards, based on a user-provided lambda expression over the payload. Using Multicast, one can selectively replicate tuples to result shards to implement theta-joins, parallel multi-way joins, and matrix operations, spatio-temporal computations, etc. In various examples, the transformations may include one or more of each of the above listed operations. In some examples, the transformations may include one or more of a sub-set of the above listed operations. For example, the transformations can include a query operation, a re-key operation and a re-distribute operation. For another example, the transformations can include a query operation, a broadcast operation, a re-key operation and a re-distribute operation.

At 1006, the computing device can access the input dataset. In examples in which the input dataset is stored in a distributed computing resource, the computing device can instruct a virtual worker to access the input dataset.

At 1008, the computing device can apply the transformation operation to the input dataset. In various examples, each transformation operation can occur on the input dataset as a separate function. By separating the keying, data movement and/or query logic, the computing device can build complex distributed physical plans in an integrated manner by performing transformations and actions on data in a situationally dependent manner. The distributed physical plans can be executed efficiently at different scales, and can also be reused for future query operations. For example, in a multi-core setting with a large number of groups, re-distributing raw data may be computationally expensive. As such, the query processing and data analytics system can allow a re-key of data, to organize payloads of the shards of data, and then a first calculation on the re-keyed data. Based on the first calculation, the shards of data can be re-distributed among the datasets, and a second computation can take place. Thus, the delay of the re-distribution can dramatically reduce the amount of network traffic, as the first calculation can decrease the amount of data to be re-distributed. By separating incremental query logic specification, a small but rich set of data movement operations, and keying, one can build complex distributed physical plans in a HLL that target different scales, including physical plans of modern scan-based columnar databases, continuous queries (e.g., hybrid symmetric hash and broadcast joins), and distributed settings (e.g., selective data replication for multi-way or theta joins and matrix operations). Critically, the physical plans are transferable by construction, between real-time and offline deployments.

At 1010, the computing device can generate a resultant dataset. In some examples, the resultant datasets can be cached to memory for lookup and reuse in a similar query scenario. By saving the datasets (e.g., in main memory and/or external storage), the query processing and data analytics system can save computation time in future queries, thereby increasing the overall efficiency of the system. In some examples, the resultant dataset can be stored on a machine, across multiple machines, and/or across one or more cores of one or more machines. In various examples, the resultant dataset can be stored across a plurality of nodes, such as in a distributed service platform.

Figure 11:
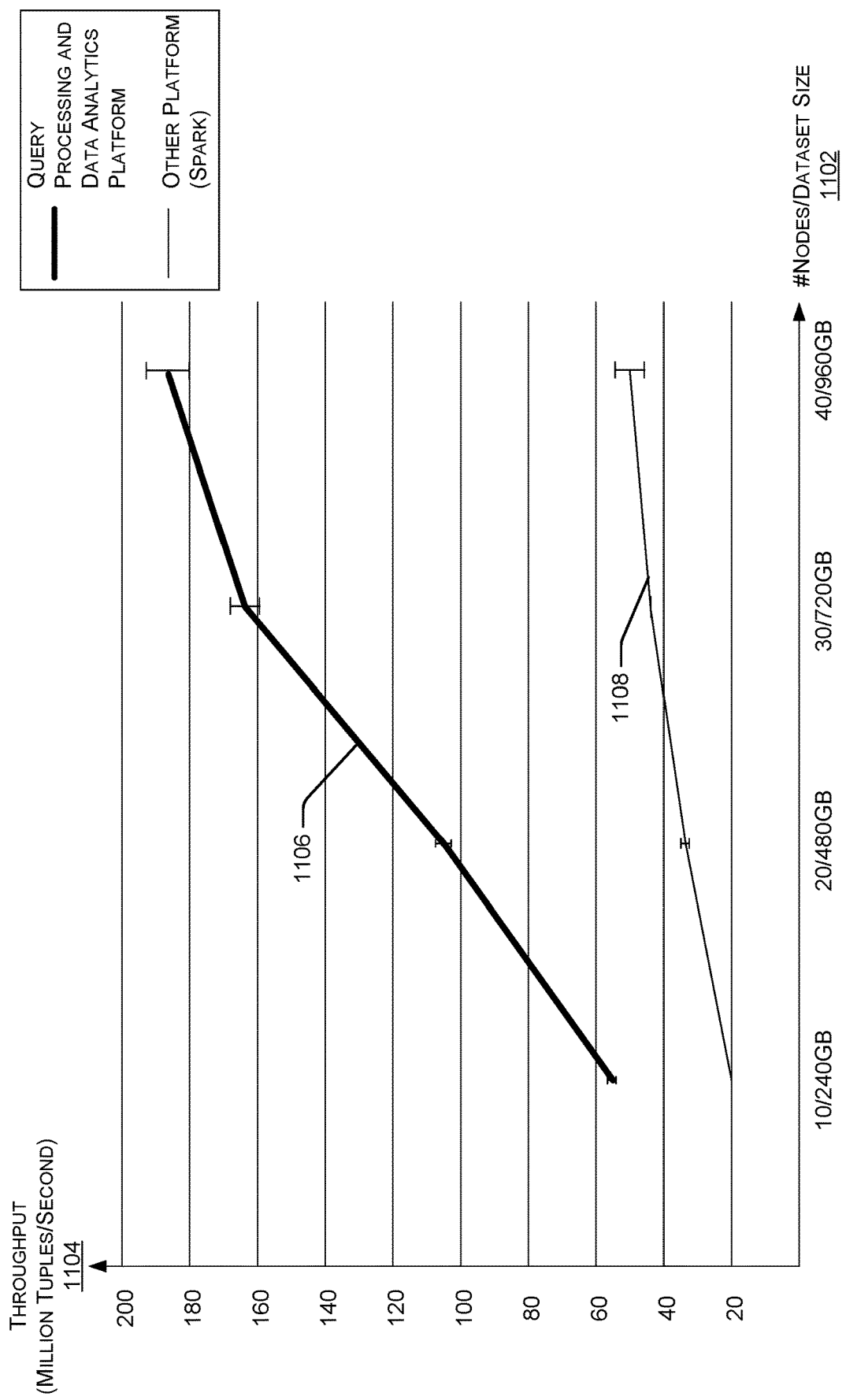
FIG. 11 illustrates an example diagram of an improved performance of a query processing and data analytics platform over another platform.

FIG. 11 illustrates an example diagram 1100 of an improved performance of a query processing and data analytics system over the prior art. The example diagram 1100 is an illustration of aggregate performance (e.g., computing the total revenue originated per sourceIP) of the query processing and data analytics platform described in FIGS. 1-10, compared to another platform, "Spark™." The x-axis of the diagram comprises a number of nodes per dataset size. The dataset sizes are compared at 10/240 GB, 20/480 GB, 30/720 GB, and 40/960 GB. The y-axis of the diagram comprises a throughput in millions of tuples per second.

In the illustrative example, the query processing and data analytics platform results illustrated as line 1106 significantly outperform the other platform, Spark™, illustrated as line 1108. In fact, as the number of nodes per dataset size increases, the throughput of the query processing and data analytics platform increases dramatically, from 55 million tuples per second at 10/240 GB to 186 million tuples per second at 40/960 GB, as compared to the 20 million tuples per second and 50 million tuples per second of the other platform, respectively.

Additionally, the query processing and data analytics platform significantly outperforms other platforms in scan performance (e.g., running a scan query) and join performance (e.g., calculating a sourceIP and associated pageRank that gave rise to the highest revenue for a given period of time (e.g., one week).

Figure 12:
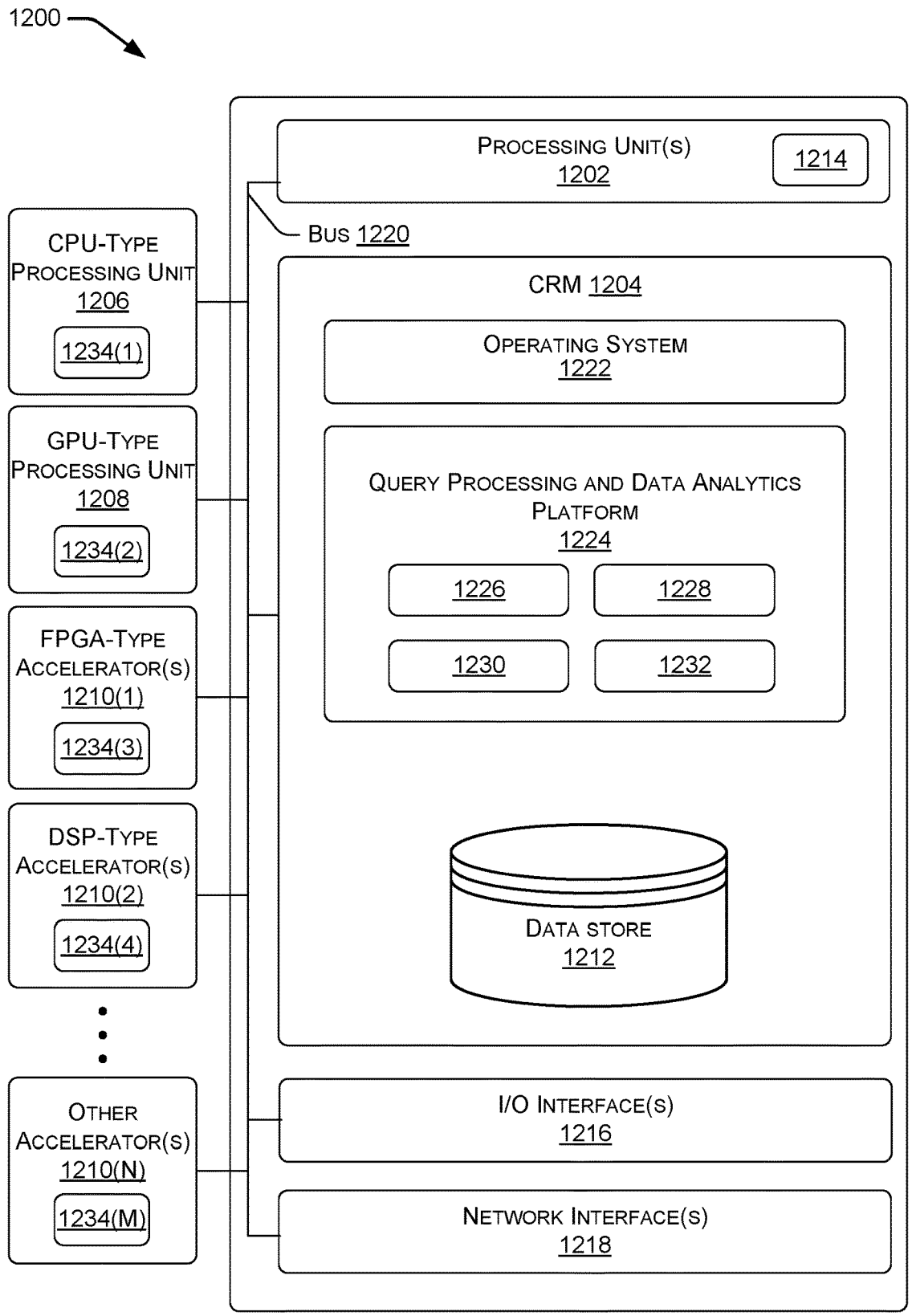
FIG. 12 illustrates an example device configured to support a query processing and data analytics platform.

FIG. 12 illustrates an example device including an example device configured to support a query processing and data analytics system, such as the computing device 102 from FIG. 1. In device 1200, processing unit(s) 1202 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In some examples, the query processing and data analytics system can run on code stored to on the computing device 1200, such as in a computer-readable media (CRM) 1204.

In some examples, CRM 1204, can represent CRM 110 and can store instructions executable by the processing unit(s) 1202, which as discussed above, can represent a processing unit incorporated in device 1200. CRM 1204 can also store instructions executable by external processing units such as by an external CPU-type processing unit 1206, an external GPU-type processing unit 1208, and/or executable by an external accelerator 1210, such as an FPGA-type accelerator 1210(1), a DSP-type accelerator 1210(2), or any other accelerator 1210(N). In various examples at least one CPU-type processing unit, GPU-type processing unit, and/or accelerator is incorporated in device 1200, while in some examples one or more of a CPU-type processing unit, GPU-type processing unit, and/or accelerator is external to device 1200.

In the illustrated example, CRM 1204 also includes a data store 1212. In some examples, data store 1212 includes data storage such as a database, data warehouse, or other type of structured or unstructured data storage. In some examples, data store 1212 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 1212 can store data for the operations of processes, applications, components, and/or modules stored in CRM 1204 and/or executed by processing unit(s) 1202. Alternately, some or all of the above-referenced data and/or instructions can be stored on separate memories 1214 on board one or more processing unit(s) 1202, CPU-type processing unit 1206, GPU-type processing unit 1208 and/or accelerator(s) 1210.

Device 1200 can further include one or more input/output (I/O) interfaces 1216 to allow device 1200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device 1200, network interface(s) 1218, can represent, for example, network interface controllers (NICs) or other types of transceiver devices to send and receive communications over a network.

In various examples, the network interface(s) 1218 can be configured to communicate with one or more other devices storing datasets to be used in the query processing and data analytics system. In some examples, the one or more other devices can be substantially similar to the computing device 102. In some examples, the one or more other devices can include computing devices with memory, communication, and processing capabilities. For example, the one or more other devices can include, but are not limited to, server computers or blade servers such as web servers, non-uniform memory access (NUMA) enabled computers, or other computation engines or network-attached storage units, desktop computers, laptop computers, thin clients, terminals, or other mobile computers, personal data assistants (PDAs), wearable computers such as smart watches or biometric or medical sensors, implanted computing devices such as biometric or medical sensors, computer navigation consumer computing devices, satellite-based navigation system devices including global positioning system (GPS) devices and other satellite-based navigation system devices, smartphones, mobile phones, mobile phone-tablet hybrid devices, or other telecommunication devices, tablet computers or tablet hybrid computers, portable or console-based gaming devices or other entertainment devices such as network-enabled televisions, set-top boxes, media players, cameras, or personal video recorders (PVRs), or integrated components for inclusion in computing devices, appliances, or other computing devices configured to participate in or carry out query processing and data analytics as described herein. The one or more other devices can be configured to communicate with the computing device 1200, to share globally data and/or results of computations between the computing device 1200 and the one or more other devices.

In the illustrated example, device 1200 can operably connect the processing unit(s) 1202 to CRM 1204, I/O interface(s) 1216, and network interface(s) 1218 via a bus 1220. In some examples, bus 1220 can include one or more of a system bus, a data bus, an address bus, a PCI bus, a Mini-PCI bus, and any variety of local, peripheral, and/or independent buses.

In the illustrated example, CRM 1204 also includes an operating system 1222. The operating system 1222 can be MICROSOFT WINDOWS, WINDOWS, QNX™, IBM z/OS™, LINUX, ANDROID, iOS™, OS X™, NETBSD™, or any other operating system capable of managing computer hardware and software resources on device 1200.

CRM 1204 also includes a query processing and data analytics framework 1224. The query processing and data analytics framework 1224 can include one or more modules and/or APIs, which are illustrated as blocks 1226, 1228, 1230, and 1232, although this is just an example, and the number can vary higher or lower. Functionality described associated with blocks 1226, 1228, 1230, and 1232, can be combined to be performed by a fewer number of modules and/or APIs, or it can be split and performed by a larger number of modules and/or APIs. For example, block 1226 can represent a user interface.

Block 1228 can represent a query module. In various examples, the query module can receive an input query, such as via the one or more I/O interface(s) 1216. The query module can process the input query, and determine a topic of the query. In some examples, the query module can identify one or more datasets located on one or more networked computing devices. The one or more networked computing devices can include computing device 1200, one or more other computing devices, and/or one or more nodes in a distributed service platform.

Block 1230 can represent a transformation module. In various examples, the transformation module can cause one or more transformations to be performed on the one or more identified datasets. The transformations can include query operations (e.g., applying an unmodified query over each shard), re-shard operations (e.g., round-robin movement of shard contents to achieve equal shard sizes), broadcast operations (e.g., duplicate shard content across all of the shards), re-key operations (e.g., change the key associated with each row in each shard), re-distribute operations (e.g., data movement across shards in a same machine so that same key resides in each shard, data movement across shards in different machines so that same key resides in each shard), and re-naming operations (e.g., construct new payload on each shard).

In various examples, the transformations may include one or more of each of the above listed operations. In some examples, the transformations may include one or more of a sub-set of the above listed operations. For example, the transformations can include a query operation, a re-key operation and a re-distribute operation. For another example, the transformations can include a query operation, a broadcast operation, a re-key operation and a re-distribute operation.

Block 1232 can represent an action module. In various examples, the action module can include logic to program the processing unit(s) 1202 to materialize query results, such as materializing the transformation results into a main memory (e.g., store computation to a potentially distributed in-memory dataset), to a specified path (e.g., store the results in a persistent data store), to an input/output stream (e.g., take an array of I/O streams as parameter and output each shard in an efficient binary format to the corresponding I/O-stream in the array), and/or to accept specific instructions to operate directly on the results.

Alternatively, some or all of the above-referenced data can be stored on separate memories 1234, such as memory 1234(1) on board a CPU-type processing unit 1206, memory 1234(2) on board a GPU-type processing unit 1208, memory 1234(3) on board an FPGA-type accelerator 1210(1), memory 1234(4) on board a DSP-type accelerator 1210(2), and/or memory 1234(M) on board another accelerator 1210(N).

Example Clauses

A: A system comprising: one or more processors; and one or more computer-readable media having stored thereon computer-executable instructions, the computer-executable instructions responsive to execution by the one or more processors to configure a device to perform operations comprising: receiving an identification of an input dataset; receiving a transformation operation to be applied to the input dataset, wherein the transformation operation comprises one or more of: a query comprising transferable computation logic; a re-keying operation configured to associate a tuple in a shard of the one or more shards in the input dataset with an identifier; or a data movement operation; accessing the input dataset based at least in part on the identification, the input dataset comprising one or more shards of data; applying the transformation operation to the input dataset; and generating a resultant dataset based at least in part on a transformed dataset.

B: A system as paragraph A describes, wherein the input dataset comprises data stored in a time-stamped order.

C; A system as paragraph B describes, wherein the data movement operation comprises one or more of: a broadcast join; a multicast join; or a re-distribution of contents of the one or more shards of data in the input dataset based at least in part on the identifier.

D: A system as any of paragraphs A-C describe, wherein the one or more shards of data are located over distributed memory.

E: A system as any of paragraphs A-D describe, wherein the input dataset comprises a first portion stored on a first machine of a distributed service platform and a second portion stored on a second machine of the distributed service platform, and wherein the transformation operation is performed by a virtual worker on the distributed service platform F: A system as any of paragraphs A-E describe, wherein the input dataset comprises a first portion located on a first core of a machine and a second portion located on a second core of the machine, and the transformation operation is based at least in part on a bandwidth between the first core of the machine and the second core of the machine.

G: A system as any of paragraphs A-F describe, the operations further comprising: receiving an identification of a second input dataset; accessing the second input dataset, the second input dataset comprising one or more shards of data; and applying the transformation operation to the second input dataset, wherein the transformation operation is a two-input transformation operation applied across a pair of shards in the input dataset and the second input dataset and wherein the resultant dataset comprises data from the input dataset and the second input dataset H: A system as any of paragraphs A-G describe, the operations further comprising: receiving a query; applying a query optimizer to the query; generating a distributed physical plan; and receiving a modification to the distributed physical plan.

I: A computer-readable medium having thereon computer-executable instructions that, responsive to execution, configure a computer to perform a method as any one of paragraphs A-H describes.

J: A method comprising: defining a cluster of two or more machines, each of the two or more machines comprising at least one dataset; requesting to establish a communication path with a virtual worker associated with the cluster; associating an identifier with the virtual worker; sending operations to the virtual worker via the communication path based at least in part on the identifier, the transformation operations including: accessing a first dataset, the first dataset comprising at least two shards of data; accessing a second dataset, the second dataset comprising at least two shards of data; and generating a third dataset and a fourth dataset by redistributing data between one or more of: the at least two shards of data on the first dataset; the at least two shards of data on the second dataset; or the first dataset and the second dataset.

K: A method as paragraph J describes, wherein the sending the operations further comprises one or more of: sending a query comprising transferable computation logic; sending a re-keying operation configured to associate a tuple in a shard of the one or more shards in the input dataset with an identifier; or sending a data movement operation.

L: A method as either paragraphs J or K describe, wherein the sending the operations further comprises: accessing a reference dataset, the reference dataset comprising at least two shards of data, wherein the generating the third dataset and the fourth dataset further comprises joining the reference dataset to the first dataset and the second dataset.

M: A method as paragraph L describes, wherein the joining the reference dataset to the first dataset and the second dataset comprises: identifying a reference shard of the at least two shards of data associated with the reference dataset; identifying a first shard of the at least two shards of data associated with the first dataset; identifying a second shard of the at least two shards of data associated with the second dataset; and sending data in the first shard to the first shard and the second shard.

N: A method as paragraph L describes, wherein the joining the reference dataset to the first dataset and the second dataset comprises sending data in the at least two shards of data associated with the reference dataset to the at least two shards of data associated with the first dataset and the at least two shards of data associated with the second dataset.

O: A method as any of paragraphs J-N describe, wherein the at least two shards of data associated with the first dataset and the at least two shards of data associated with the second dataset comprise data stored in a time-stamped order.

P: A method as any of paragraphs J-O describe, further comprising: storing, by the virtual worker, the third dataset and the fourth dataset in a disk dataset or an in-memory dataset; and storing, by the virtual worker, metadata associated with the third dataset and the fourth dataset in a metadata table.

Q: A computer-readable medium having thereon computer-executable instructions that responsive to execution configure a computer to perform a method as any one of paragraphs J-P describes.

R: A device or system comprising: a processor; and a computer-readable medium coupled to the processor, the computer-readable medium including instructions to configure one or more devices to perform a method as any of paragraphs J-P describes.

S: A device or system comprising: means for processing; and means for storing coupled to the means for processing, the means for storing, storing instructions to configure one or more devices to perform a method as any of paragraphs J-P describes.

T: A device comprising: one or more processors; one or more computer-readable media having thereon computer-executable instructions, the computer executable instructions responsive to execution to configure the device to perform operations comprising: receiving an identification of an input dataset; receiving a transformation operation to be applied to the input dataset, wherein the transformation operation comprises one or more of: a query comprising transferable computation logic; a re-keying operation configured to associate a tuple in a shard of the one or more shards in the input dataset with an identifier; or a data movement operation; accessing the input dataset based at least in part on the identification, the input dataset comprising one or more shards of data; applying the transformation operation to the input dataset; and generating a resultant dataset based at least in part on the transformed dataset.

U: A device as paragraph T describes, wherein the input dataset comprises data stored in a time-stamped order.

V: A device as either of paragraphs T or U describe, wherein the data movement operation comprises one or more of: a broadcast join; a multicast join; or a re-distribution of contents of the one or more shards of data in the input dataset based at least in part on the identifier.

W: A device as any of paragraphs T-V describe, wherein the input dataset comprises a first portion located on a first machine and a second portion located on a second machine, and the transformation operation comprises a redistribution of data between the first machine and the second machine.

X: A device as any of paragraphs T-W describe, the operations further comprising: receiving a query; applying a query optimizer to the query; generating a distributed physical plan; and receiving a modification to the distributed physical plan.

Y: A system comprising: one or more processors; and one or more computer-readable media having stored thereon computer-executable instructions, the computer-executable instructions responsive to execution by the one or more processors to configure a device to perform operations comprising: receiving a query; accessing a first dataset based at least in part on the query, the first dataset comprising at least two shards of data; assigning a first data identifier to a first shard of at least two shards of data and assigning a second data identifier to a second shard of the at least two shards of data; redistributing data between the at least two shards of data based at least in part on the data identifier, wherein the redistributing data creates at least a second dataset; receiving a query operation based at least in part on the query; performing a calculation on data in the second dataset, the calculation being based at least in part on the query and the query operation; and causing output of the calculation for presentation on a display.

Z: A system as paragraph Y describes, the operations further comprising: accessing a third database based at least in part on the query; and prior to the assigning the data identifier, joining the first database and the third database into a fourth database.

AA: A system as paragraph Z describes, wherein the joining the first database and the third database into a fourth database comprises: selecting a particular shard of the at least two shards of data on the first database; selecting a shard on the third database; and sending data of the shard on the third database to the particular shard of the at least two shards of data on the first database.

AB: A system as paragraph Z describes, wherein the joining the first database and the third database into a fourth database comprises sending data on each shard on the third database to each shard of the at least two shards of data on the first database.

AC: A system as any of paragraphs Y-AB describe, the operations further comprising: prior to the redistributing the data, receiving a third query operation; and performing a second calculation on data in the first dataset based at least in part on the third query operation.

AD: A system as any of paragraphs Y-AC describe, wherein the first dataset comprises a first portion stored on a first machine of a distributed service platform and a second portion stored on a second machine of the distributed service platform, and wherein the assigning the data identifier, the generating the second dataset, the redistributing the data, the receiving the second query and the computing the aggregation are performed by a virtual worker on the distributed service platform.

AE: A system as any of paragraphs Y-AD describe, wherein the first dataset comprises a first portion located on a first core of a machine and a second portion located on a second core of the machine, and the redistributing data is based at least in part on a bandwidth between the first core of the machine and the second core of the machine.

AF: A system as any of paragraphs Y-AE describe, wherein the first dataset comprises a first portion located on a first machine and a second portion located on a second machine, and the redistributing data between the at least two shards of data is based at least in part on the data identifier comprises a redistribution of data between the first machine and the second machine.

AG: A computer-readable medium having thereon computer-executable instructions that, responsive to execution, configure a computer to perform a method as any one of paragraphs Y-AF describes.

AF: A device comprising: one or more processors; one or more computer-readable media having thereon computer-executable instructions, the computer executable instructions responsive to execution to configure the device to perform operations comprising: accessing a first dataset, the first dataset comprising a plurality of shards of data; applying a first query operation to the first dataset to generate a second dataset, the second dataset comprising at least a portion of the plurality of shards of data; assigning a data identifier to individual shards of the portion of the plurality of shards of data; redistributing data across the portion of the plurality of shards of data; performing a calculation on the third dataset based at least in part on a query; and outputting a result of the calculation for presentation on a display.

AG: A device as paragraph AF describes, the operations further comprising: accessing a fourth dataset, the fourth data set comprising a plurality of shards of reference data; prior to the redistributing data, sending the plurality of shards of reference data to the portion of the plurality of shards of data.

AH: A device as either of paragraphs AF or AG describe, the operations further comprising: accessing a fourth dataset, the fourth data set comprising a plurality of shards of reference data; prior to the redistributing data, sending a particular shard of the plurality of shards of reference data to the portion of the plurality of shards of data.

AI: A device as any of paragraphs AF-AH describe, wherein the first dataset comprises a first portion located on a first machine and a second portion located on a second machine, and the redistributing data across the portion of the plurality of shards of data comprises a redistribution of data between the first machine and the second machine.

AJ: A device as any of paragraphs AF-AI describe, wherein the first dataset comprises a first portion located on a first machine and a second portion located on a second machine, and the operations further comprise: calculating a bandwidth between the first machine and the second machine; and prior to the redistributing data across the portion of the plurality of shards, performing a second calculation on the second dataset.

AK: A computer-readable medium having thereon computer-executable instructions that responsive to execution configure a computer to perform a method as any one of paragraphs AF-AJ describes.

AL: A method comprising: accessing a first dataset, the first dataset comprising a plurality of shards of data; applying a first query operation to the first dataset to generate a second dataset, the second dataset comprising at least a portion of the plurality of shards of data; assigning a data identifier to individual shards of the portion of the plurality of shards of data; redistributing data across the portion of the plurality of shards of data; performing a calculation on the third dataset based at least in part on a query; and outputting a result of the calculation for presentation on a display.

AM: A method as paragraph AL describes, further comprising: accessing a fourth dataset, the fourth data set comprising a plurality of shards of reference data; prior to the redistributing data, sending the plurality of shards of reference data to the portion of the plurality of shards of data.

AN: A method as either of paragraphs AL or AM describe, further comprising: accessing a fourth dataset, the fourth data set comprising a plurality of shards of reference data; prior to the redistributing data, sending a particular shard of the plurality of shards of reference data to the portion of the plurality of shards of data.

AO: A method as any of paragraphs AL-AN describe, wherein the first dataset comprises a first portion located on a first machine and a second portion located on a second machine, and the redistributing data across the portion of the plurality of shards of data comprises a redistribution of data between the first machine and the second machine.

AP: A method as any of paragraphs AL-AO describe, wherein the first dataset comprises a first portion located on a first machine and a second portion located on a second machine, and the operations further comprise: calculating a bandwidth between the first machine and the second machine; and prior to the redistributing data across the portion of the plurality of shards, performing a second calculation on the second dataset.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 504, 506, or 900, such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media having stored thereon computer-executable instructions, the computer-executable instructions responsive to execution by the one or more processors to configure a device to perform operations comprising:
   receiving an identification of an input dataset, wherein the input dataset comprises one or more shards of data;
   re-keying the input dataset based on the identification;
   redistributing, based on the re-keying, the input dataset into multiple datasets such that the one or more shards of data have a same identifier;
   receiving a transformation operation to be applied to the input dataset, wherein the transformation operation comprises one or more of:
   a query comprising transferable computation logic; or
   a data movement operation;
   accessing the input dataset based at least in part on the identification;
   applying the transformation operation to one of the multiple datasets; and
   generating a resultant dataset based at least in part on a transformed dataset.

2. The system as claim 1 recites, wherein re-keying the input set comprises a per-key hash pre-computation.

3. The system as claim 2 recites, wherein the data movement operation comprises one or more of:
   a broadcast join;
   a multicast join; or
   a re-distribution of contents of the one or more shards of data in the reduced input dataset based at least in part on the identifier.

4. The system as claim 1 recites, wherein the one or more shards of data are located over distributed memory, and wherein the operations further comprise performing a first calculation on the input dataset to form a reduced input dataset and wherein re-keying the input data set is performed on the reduced input dataset.

5. The system as claim 1 recites, wherein the input dataset comprises a first portion stored on a first machine of a distributed service platform and a second portion stored on a second machine of the distributed service platform, and wherein the transformation operation is performed by a virtual worker on the distributed service platform.

6. The system as claim 1 recites, wherein the input dataset comprises a first portion located on a first core of a machine and a second portion located on a second core of the machine, and the transformation operation is based at least in part on a bandwidth between the first core of the machine and the second core of the machine.

7. The system as claim 1 recites, the operations further comprising:
   receiving an identification of a second input dataset;
   accessing the second input dataset, the second input dataset comprising one or more shards of data; and
   applying the transformation operation to the second input dataset,
   wherein the transformation operation is a two-input transformation operation applied across a pair of shards in the input dataset and the second input dataset and wherein the resultant dataset comprises data from the input dataset and the second input dataset.

8. The system as claim 1 recites, the operations further comprising:
   receiving a query;
   applying a query optimizer to the query;
   generating a distributed physical plan; and
   receiving a modification to the distributed physical plan.

9. A method comprising:
   defining a cluster of two or more machines, each of the two or more machines comprising at least one dataset;
   requesting to establish a communication path with a virtual worker associated with the cluster;
   associating an identifier with the virtual worker;
   sending operations to the virtual worker via the communication path based at least in part on the identifier, the transformation operations including:
   accessing a first dataset, the first dataset comprising at least two shards of data;
   accessing a second dataset, the second dataset comprising at least two shards of data;
   re-keying the first dataset such that each of the at least two shards of data of the first dataset has an identifier based on a first topic;
   re-keying the second dataset such that each of the at least two shards of data of the second dataset has an identifier based on a second topic; and
   generating a third dataset and a fourth dataset by redistributing data in the first dataset and the second set such that data shards in the third dataset have the same identifier and the data shards in the fourth data have the same identifier.

10. The method as claim 9 recites, wherein the sending the operations further comprises one or more of:
    sending a query comprising transferable computation logic;
    or
    sending a data movement operation.

11. The method as claim 9 recites, wherein the sending the operations further comprises:
    accessing a reference dataset, the reference dataset comprising at least two shards of data,
    wherein the generating the third dataset and the fourth dataset further comprises joining the reference dataset to the first dataset and the second dataset.

12. The method as claim 11 recites, wherein the joining the reference dataset to the first dataset and the second dataset comprises:
    identifying a reference shard of the at least two shards of data associated with the reference dataset;
    identifying a first shard of the at least two shards of data associated with the first dataset;
    identifying a second shard of the at least two shards of data associated with the second dataset; and
    sending data in the first shard to the first shard and the second shard.

13. The method as claim 11 recites, wherein the joining the reference dataset to the first dataset and the second dataset comprises sending data in the at least two shards of data associated with the reference dataset to the at least two shards of data associated with the first dataset and the at least two shards of data associated with the second dataset.

14. The method as claim 9 recites, wherein the at least two shards of data associated with the first dataset and the at least two shards of data associated with the second dataset comprise data stored in a time-stamped order.

15. The method as claim 9 recites, further comprising:
    storing, by the virtual worker, the third dataset and the fourth dataset in a disk dataset or an in-memory dataset; and
    storing, by the virtual worker, metadata associated with the third dataset and the fourth dataset in a metadata table.

16. A device comprising:
    one or more processors;
    one or more non-transitory computer-readable media having thereon computer-executable instructions, the computer executable instructions responsive to execution to configure the device to perform operations comprising:
    receiving an identification of an input dataset, wherein the input dataset comprises one or more shards of data;
    re-keying the input dataset based on the identification;
    redistributing, based on the re-keying, the input dataset into multiple datasets such that the one or more shards of data have the same identifier;
    receiving a transformation operation to be applied to the input dataset, wherein the transformation operation comprises one or more of:
    a query comprising transferable computation logic; or
    a data movement operation;
    accessing the input dataset based at least in part on the identification;
    applying the transformation operation to one of the multiple datasets; and
    generating a resultant dataset based at least in part on the transformed dataset.

17. The device as claim 16 recites, wherein the input set comprises tuples and wherein re-keying the input set comprises modifying each tuple in the input datasets to have a different key.

18. The device as claim 16 recites, wherein the data movement operation comprises one or more of:
    a broadcast join;
    a multicast join; or
    a re-distribution of contents of the one or more shards of data in the input dataset based at least in part on the identifier.

19. The device as claim 16 recites, wherein the input dataset comprises a first portion located on a first machine and a second portion located on a second machine, and the transformation operation comprises a redistribution of data between the first machine and the second machine.

20. The device as claim 16 recites, the operations further comprising:
    receiving a query;
    applying a query optimizer to the query;
    generating a distributed physical plan; and
    receiving a modification to the distributed physical plan.

* * * * *